US012358302B2

(12) United States Patent
Nakatani

(10) Patent No.: US 12,358,302 B2
(45) Date of Patent: Jul. 15, 2025

(54) THERMAL PRINT HEAD, MANUFACTURING METHOD OF THE SAME, AND THERMAL PRINTER

(71) Applicant: ROHM CO., LTD., Kyoto (JP)

(72) Inventor: Goro Nakatani, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 153 days.

(21) Appl. No.: 18/153,165

(22) Filed: Jan. 11, 2023

(65) Prior Publication Data

US 2023/0182482 A1 Jun. 15, 2023

Related U.S. Application Data

(63) Continuation of application No. PCT/JP2021/023912, filed on Jun. 24, 2021.

(30) Foreign Application Priority Data

Aug. 6, 2020 (JP) ................................ 2020-133780
Aug. 31, 2020 (JP) ................................ 2020-145965

(51) Int. Cl.
*B41J 2/335* (2006.01)

(52) U.S. Cl.
CPC ......... *B41J 2/33515* (2013.01); *B41J 2/3351* (2013.01); *B41J 2/33535* (2013.01); *B41J 2/3354* (2013.01)

(58) Field of Classification Search
CPC .. B41J 2/33515; B41J 2/3351; B41J 2/33535; B41J 2/3354; B41J 2/34; B41J 2/345
See application file for complete search history.

(56) References Cited

U.S. PATENT DOCUMENTS 6,184,913 B1 * 2/2001 Nagano .................. B41J 2/3355 347/203
6,339,444 B1 * 1/2002 Sugiyama .............. B41J 2/3357 347/205

FOREIGN PATENT DOCUMENTS

JP H5-89716 4/1993
JP 2000-141729 5/2000

OTHER PUBLICATIONS

International Search Report and Written Opinion of PCT/JP2021/023912, Sep. 14, 2021, 8 pages including English translation of the International Search Report.
First Chinese Office Action dated Jun. 29, 2024 issued in Chinese Patent Application No. 202180057617.5, 11 pages, English machine translation provided.

* cited by examiner

*Primary Examiner* — Geoffrey S Mruk
(74) *Attorney, Agent, or Firm* — HSML P.C.

(57) ABSTRACT

Provided is a thermal print head including: a substrate having a convex part thereon; a wiring layer over the convex part; a heat storage layer over the wiring layer; a heating resistive part that is formed over the heat storage layer and is arranged along a main scanning direction; a first electrode in contact with the heating resistive part on one side in a sub-scanning direction; a second electrode in contact with the heating resistive part on another side in the sub-scanning direction; and a connection wiring formed in an opening that passes through the heating resistive part and the heat storage layer and reaches the wiring layer, in which the first electrode is electrically connected to the wiring layer via the connection wiring.

11 Claims, 19 Drawing Sheets

THERMAL PRINT HEAD, MANUFACTURING METHOD OF THE SAME, AND THERMAL PRINTER

CROSS REFERENCE TO RELATED APPLICATIONS AND INCORPORATION BY REFERENCE

This is a continuation application (CA) of PCT Application No. PCT/JP2021/023912, filed on Jun. 24, 2021, which claims priority to Japan Patent Application No. P2020-133780 filed on Aug. 6, 2020, and Japan Patent Application No. P2020-145965 filed on Aug. 31, 2020, and is based upon and claims the benefit of priority from prior Japan Patent Application No. P2020-133780 filed on Aug. 6, 2020, Japan Patent Application No. P2020-145965 filed on Aug. 31, 2020, and PCT Application No. PCT/JP2021/023912, filed on Jun. 24, 2021; the entire contents of each of which are incorporated herein by reference.

BACKGROUND OF THE INVENTION

Technical Field

The present embodiment relates to a thermal print head, a manufacturing method of the same, and a thermal printer.

A thermal print head includes a large number of heating parts arranged in a main scanning direction on a head substrate, for example. Each heating part is formed as follows: a resistor layer (also referred to as a heat generation resistor) is laminated on the head substrate with a glaze layer (also referred to as a heat storage layer) therebetween, and ends of a common electrode and an individual electrode face each other such that a part of the resistor layer is exposed. By energizing the common electrode and the individual electrode, the exposed part (the heating part) of the resistor layer generates heat due to Joule heat. By transferring the heat to a printing medium (a barcode sheet, thermal paper for making a receipt, or the like), printing is performed on the printing medium.

At a distribution center or the like, the classification of an article, the details of the content, and the ID number are printed on a label, and the label is used to simplify and streamline the inspection process, for example.

In recent years, however, traceability has become more important, and all kinds of pieces of information such as manufacturing plant ID codes, dates of manufacture, and expiration dates are printed on printing mediums such as labels and receipts. In addition, in the field of foodstuffs and the like, the labelling of nutritional ingredients has become mandatory and there are changes in allergy labeling. In the field of logistics, the amount of printed information and label printing has been on the rise.

To enable the increasing high-volume of printing, it is required that a thermal print head prints information on a printing medium at high speed and with high definition. In order to perform printing at high speed and with high definition, it is necessary to make the pitch between the wiring (equal to the pitch between heating resistive parts) small. However, in the wiring formation process of a high-definition thermal print head, the wiring is integrated more densely. This frequently causes short circuits and disconnection of the wiring. Accordingly, the manufacturing yield may be significantly reduced.

In addition, wiring layers such as a common electrode and an individual electrode are formed by wiring patterns being formed by screen-printing pastes using metals such as gold and silver.

However, a paste used as a wiring pattern contains a solvent (dispersion medium) for dispersing metal particles. Due to the solvent, the wiring pattern may spread beyond a designed pattern. This makes it difficult to increase the density of the wiring pattern and form a high-definition wiring pattern. Accordingly, the manufacturing yield may be significantly reduced.

SUMMARY OF THE INVENTION

One aspect of the present embodiment has been made in view of the above and in order to solve at least one of the above problems, and provides a thermal print head that ensures a good yield. Further, another aspect of the present embodiment provides a manufacturing method of the thermal print head. Still further, another aspect of the present embodiment provides a thermal printer having the thermal print head.

DETAILED DESCRIPTION OF THE INVENTION

Figure 1:
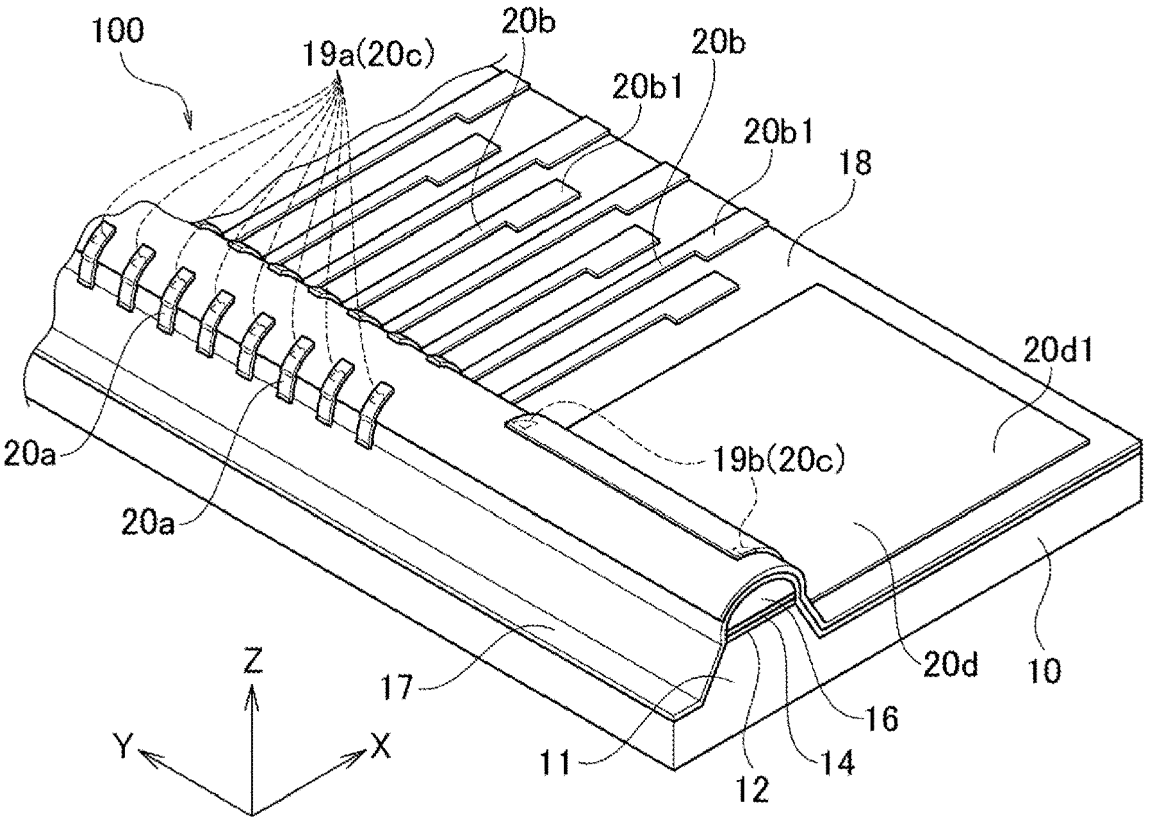
FIG. 1 is a perspective view for explaining a single substrate used in a thermal print head according to a first embodiment, and some parts thereof are omitted.

Next, the present embodiment will be described with reference to the drawings. In the drawings described below, the same or similar parts are denoted by the same or similar reference numerals. It should be noted, however, that the drawings are schematic, and that the relationships or the like between the thickness and the planar dimensions of each component are different from those in reality. Therefore, the specific thicknesses and dimensions should be determined in consideration of the following description. In addition, it is needless to say that the drawings include portions in which the relationships and the ratios of the dimensions are different from each other.

Further, the following embodiments exemplify an apparatus and a method for embodying a technical idea, and do not specify the material, shape, structure, disposition, and the like of each component. In the present embodiment, various modifications can be made within the scope of claims.

A specific aspect of the present embodiment is as follows.

<1> A thermal print head including: a substrate having a convex part thereon; a wiring layer over the convex part; a heat storage layer over the wiring layer; a heating resistive part that is formed over the heat storage layer and is arranged along a main scanning direction; a first electrode in contact with the heating resistive part on one side in a sub-scanning direction; a second electrode in contact with the heating resistive part on another side in the sub-scanning direction; and a connection wiring formed in an opening that passes through the heating resistive part and the heat storage layer and reaches the wiring layer, in which the first electrode is electrically connected to the wiring layer via the connection wiring.

<2> The thermal print head according to <1>, in which the wiring layer contains silicide.

<3> The thermal print head according to <1>, in which the wiring layer covers an upper surface and a side surface of the convex part.

<4> The thermal print head according to <1>, in which the wiring layer contains metal.

<5> The thermal print head according to any one of <1> to <4>, in which the substrate and the convex part are integrally formed by using a single crystal semiconductor.

<6> The thermal print head according to <5>, in which the single crystal semiconductor is made of silicon.

<7> The thermal print head according to any one of <1> to <6>, in which the first electrode is a common electrode and the second electrode is an individual electrode.

<8> A thermal printer including the thermal print head according to any one of <1> to <7>.

<9> A manufacturing method of a thermal print head including: forming a wiring film over a surface of a substrate; forming a convex part by removing a part of the substrate and forming a wiring layer over the convex part by removing a part of the wiring film; forming a heat storage layer over the wiring layer; forming heating resistive parts that are arranged along a main scanning direction over the heat storage layer; forming an opening that passes through the heating resistive parts and the heat storage layer and reaches the wiring layer; and forming a connection wiring in the opening, forming a first electrode that is electrically connected to the wiring layer via the connection wiring, and forming a second electrode that faces and is separated from the first electrode with each of the heating resistive parts therebetween along a sub-scanning direction.

<10> The manufacturing method of a thermal print head according to <9>, in which the wiring film is formed by siliciding the substrate.

<11> A manufacturing method of a thermal print head including: forming a convex part by removing a part of a substrate; forming an oxide film over the substrate; forming a wiring layer over the oxide film; forming a heat storage layer over the wiring layer; forming a plurality of heating resistive parts arranged along a main scanning direction over the heat storage layer; forming an opening that passes through the heating resistive parts and the heat storage layer and reaches the wiring layer; and forming a connection wiring in the opening, forming a first electrode that is electrically connected to the wiring layer via the connection wiring, and a second electrode that faces and is separated from the first electrode with each of the heating resistive parts therebetween along a sub-scanning direction.

<12> The manufacturing method of a thermal print head according to any one of <9> to <11>, in which the convex part is formed by performing anisotropic etching using potassium hydroxide.

<13> The manufacturing method of a thermal print head according to any one of <9> to <12>, in which the substrate is formed by using a single crystal semiconductor.

<14> The manufacturing method of a thermal print head according to <13>, in which the single crystal semiconductor is made of silicon.

<15> The manufacturing method of a thermal print head according to any one of <9> to <14>, in which the first electrode is a common electrode and the second electrode is an individual electrode.

First Embodiment

<Thermal Print Head>

A thermal print head according to the present embodiment will be described with reference to the drawings.

Figure 2:
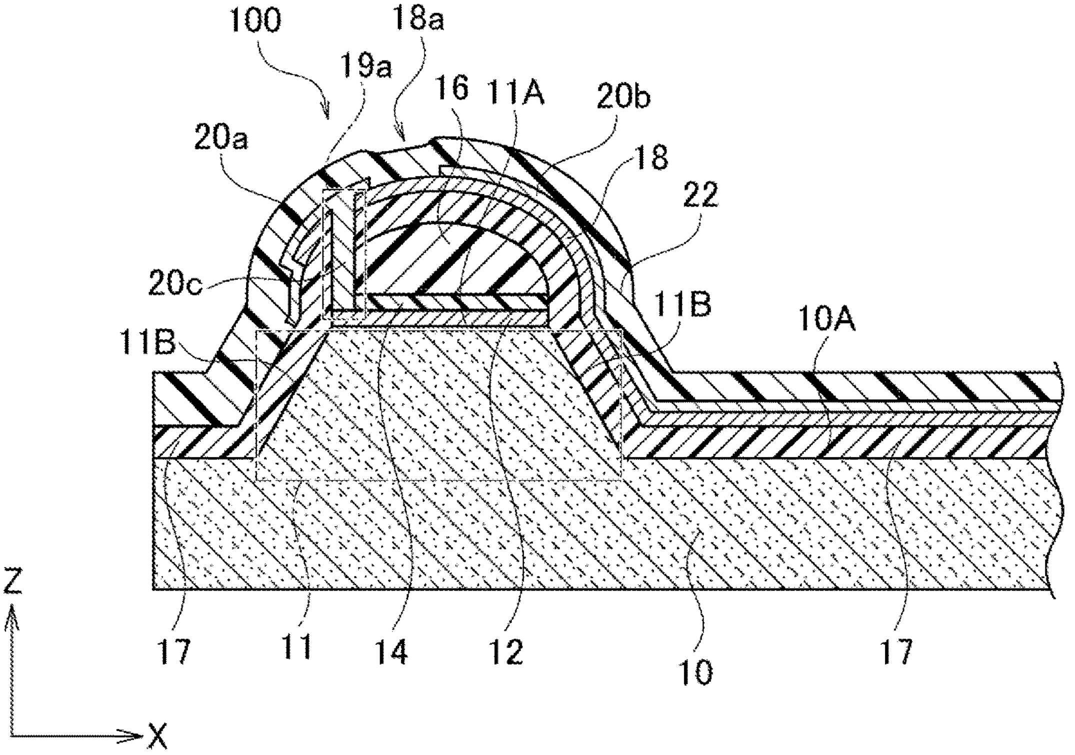
FIG. 2 is a cross-sectional view of FIG. 1.

FIGS. 1 and 2 show one substrate that is part of one thermal print head. In the present embodiment, a substrate that has been cut from a semiconductor substrate and is included in the one thermal print head is referred to as a single substrate 100. The single substrate 100 includes a substrate 10 having a convex part 11 thereon, a wiring layer 12 on the convex part 11, an insulating layer 14 on the wiring layer 12, a heat storage layer 16 on the insulating layer 14, a resistor layer 18 on the heat storage layer 16, a first electrode 20*a* in contact with the resistor layer 18, a second electrode 20*b* on the resistor layer 18, and a protective film 22 covering the resistor layer 18, the first electrode 20*a*, and the second electrode 20*b*. An opening is formed in the heat storage layer 16 and the resistor layer 18. The opening 19*a* passes through the heat storage layer 16 and the resistor layer 18. The first electrode 20*a* is electrically connected to the wiring layer 12 via connection wiring 20*c* formed in the opening 19*a*. The resistor layer 18 has a plurality of heating resistive parts 18*a* that generate heat by using a current flowing through the electrodes (the first electrode 20*a* and the second electrode 20*b*). Each of the plurality of heating resistive parts 18*a* is interposed independently between a first electrode 20*a* and second electrode 20*b* that face each other. FIG. 1 does not show the plurality of heating resistive parts 18*a*. The plurality of heating resistive parts 18*a* are linearly arranged on the heat storage layer 16 along a main scanning direction Y which will be described later. To facilitate understanding, FIG. 1 does not show the protective film 22.

A perspective view, such as FIG. 1, may show the substrate 10 corresponding to the single substrate 100 for convenience. A cross-sectional view, such as FIG. 2, may show up to outside of the substrate 10 for convenience.

In the present embodiment, a direction in which the plurality of heating resistive parts 18*a* extend linearly is defined as the main scanning direction Y. A direction that is perpendicular to the main scanning direction Y and is parallel to the upper surface of the substrate 10 is defined as a sub-scanning direction X. A direction corresponding to the thickness of the substrate 10 is defined as a thickness direction Z. In other words, the thickness direction Z is perpendicular to both of the main scanning direction Y and the sub-scanning direction X. Further, in the sub-scanning direction X, the direction in which the first electrode 20*a* is located when viewed from the second electrode 20*b* is defined as a downstream side (a downstream direction) of the sub-scanning direction X. The direction in which the second electrode 20*b* is located when viewed from the first electrode 20*a* is defined as an upstream side (an upstream direction) of the sub-scanning direction X.

The substrate 10 is made of ceramic or a single crystal semiconductor. An alumina substrate or the like can be used as the ceramic substrate, for example. A silicon substrate or the like can be used as a single crystal semiconductor substrate, for example. From the viewpoint of easily forming the convex part, it is preferable to use a single crystal semiconductor substrate for the substrate 10. From the viewpoint of heat dissipation, an alumina substrate having relatively high thermal conductivity may be used as the substrate 10. The substrate 10 having a convex part made of glass thereon may be prepared by forming convex glass on the alumina substrate, for example. An insulating layer may be formed between an upper surface 10A of the substrate 10 and the wiring layer 12. As the material of the insulating layer, silicon oxide or silicon nitride can be used, for example.

The ceramic substrate has a rectangular planar shape. The silicon substrate as the semiconductor substrate is also referred to as a silicon wafer and has a nearly circular planar shape. In both the ceramic substrate and the semiconductor substrate, one substrate 10 corresponding to the single substrate 100 is arranged in plurality in a lattice shape as viewed along the thickness direction Z. Therefore, a plurality of single substrates 100 are manufactured from both one ceramic substrate and one semiconductor substrate.

A description will be given regarding the single substrate 100 manufactured by using the silicon substrate. The wiring layer 12 is disposed on a top surface 11A of the convex part 11 formed on the substrate 10. The wiring layer 12 extends longitudinally along the main scanning direction Y. The wiring layer 12 is electrically connected to the first electrode 20*a* via the connection wiring 20*c* and functions as a common electrode of the single substrate 100. The first electrode 20*a* electrically connects both ends of the wiring layer 12 in the main scanning direction Y with an external terminal. A heating voltage is input to the first electrode 20*a*, which is a part of the common electrode, from the external terminal.

The wiring layer 12 can be formed by using a compound. The compound is obtained by performing a heat treatment on the substrate 10 and a conductive layer disposed on the substrate 10 and reacting the material of the substrate 10 with the material of the conductive layer. Examples of the conductive layer include titanium, nickel, cobalt, sodium, magnesium, platinum, tungsten, molybdenum, tantalum, vanadium, zirconium, hafnium, and the like. As the wiring layer 12, a low-resistance conductive layer can be used, for example. The low-resistance conductive layer is obtained by forming titanium on a silicon substrate, performing a heat treatment thereon, and thereby reacting (silicide) titanium with the surface of the silicon substrate.

The insulating layer 14 is formed on the wiring layer 12 by using a material having high resistance as a base of the heat storage layer 16. The insulating layer 14 is made of an insulating material, and silicon oxide or silicon nitride can be used, for example. The dimension of the insulating layer 14 in the thickness direction Z (the thickness of the insulating layer 14) is not particularly limited, and as one example, the dimension is 5 to 15 μm, and preferably 5 to 10 μm, for example.

The heat storage layer 16 is formed on the insulating layer 14 and is sometimes referred to as a glaze layer. The heat storage layer 16 extends longitudinally along the main scanning direction Y. The heat storage layer 16 stores heat generated from the heating resistive parts 18*a* which will be described later. The heat storage layer 16 can be formed by using an insulating material, for example, and silicon oxide, silicon nitride, and the like, which are the main components of glass, can be used. The dimension of the heat storage layer 16 in the thickness direction Z is not particularly limited, and is 30 to 80 μm, and preferably 40 to 60 μm, for example.

An insulating layer 17 is formed on the substrate 10 of the present embodiment. The insulating layer 17 is formed on the heat storage layer 16 and on the upper surface 10A of the substrate 10. The insulating layer 17 is made of an insulating material, for example, and a silicon oxide layer or a silicon nitride layer can be used. As the silicon oxide layer, silicon oxide obtained by depositing tetraethoxysilane (TEOS) as a raw material can be used, for example. As viewed along the main scanning direction Y, the resistor layer 18, the first electrode 20$a$, and the second electrode 20$b$, all of which will be described later, are formed on the insulating layer 17. As viewed along the main scanning direction Y, the insulating layer 17 is formed between the upper surface of the heat storage layer 16 and the resistor layer 18 including the heating resistive parts 18$a$. The insulating layer 17 may be formed between the upper surface of the heat storage layer 16 and the first and second electrodes 20$a$ and 20$b$.

A part of the resistor layer 18 to which the current from the first electrode 20$a$ and the second electrode 20$b$ flows generates heat. Specifically, a heating voltage is individually applied to the resistor layer 18 according to a print signal transmitted from the outside to a drive IC, and the resistor layer 18 is made to selectively generate heat. Due to the generation of heat by means of the resistor layer 18, printing dots are formed. The resistor layer 18 is formed by using a material having a higher resistivity than the materials forming the first electrode 20$a$ and the second electrode 20$b$, for example, and tantalum nitride or silicon oxide containing tantalum can be used. Ruthenium oxide may be used as a material of the resistor layer 18. In the present embodiment, the dimension of the resistor layer 18 in the thickness direction Z is about 0.05 to 0.2 μm, for example. One heating resistive part 18$a$ in the resistor layer 18 corresponds to one printing dot.

The first electrode 20$a$ is formed on one side (the downstream side) in the sub-scanning direction and functions as a part of the common electrode. In the opening 19$a$ provided so as to pass through the heat storage layer 16, the insulating layer 17, and the resistor layer 18, the connection wiring 20$c$ is formed by using the same material as the first electrode 20$a$. The first electrode 20$a$ is electrically connected to the wiring layer 12 via the connection wiring 20$c$. That is, the first electrode 20$a$, the connection wiring 20$c$, and the wiring layer 12 have a function as the common electrode. Further, in the present embodiment, the positions of both ends of the first electrode 20$a$ are higher than the position of the top surface 11A of the convex part 11, but the positioning is not limited thereto. The first electrode 20$a$ may be superimposed on a side surface 11B of the convex part 11 and the upper surface 10A of the substrate 10, for example. The second electrode 20$b$ is formed on the other side (the upstream side) in the sub-scanning direction and functions as an individual electrode. The first electrode 20$a$ and the second electrode 20$b$ form paths for energizing the resistor layer 18. Specifically, a current sequentially flows from the wiring layer 12, the connection wiring 20$c$, and the first electrode 20$a$, which function as the common electrode, to the second electrode 20$b$, which functions as the individual electrode, via the resistor layer 18.

The above described opening 19$a$ is provided in plurality, and these openings 19$a$ are also referred to as downstream openings. In addition, a plurality of openings 19$b$ are provided so as to pass through the heat storage layer 16, the insulating layer 17, and the resistor layer 18, and these openings 19$b$ are also referred to as upstream openings. The plurality of openings 19$a$ are arranged near the downstream end of the convex part 11 and one opening 19$a$ is arranged for the plurality of heating resistive parts 18$a$. The plurality of openings 19$a$ may be regularly arranged. In the single substrate 100, a voltage drop in the central part of the plurality of heating resistive parts 18$a$ arranged along the main scanning direction Y may be a problem. In this case, it is preferable that the plurality of openings 19$a$ are arranged sparsely near both ends along the main scanning direction Y and are arranged more densely toward the central part.

The plurality of openings 19$b$ are arranged near the upstream end of the convex part 11, and at least one of the plurality of openings 19$b$ is arranged at each of one end and the other end along the main scanning direction Y. As viewed along the thickness direction Z, the plurality of openings 19$b$ are arranged so as to overlap the wiring layer 12. It is preferable that the same number of openings 19$b$ are arranged at one end and the other end along the main scanning direction Y.

As the first electrode 20$a$, the second electrode 20$b$, and the connection wiring 20$c$, metal layers such as aluminum, copper, titanium, and gold can be used, for example. The first electrode 20$a$, the second electrode 20$b$, and the connection wiring 20$c$ may have a multilayer structure, and may have a laminated structure of a titanium layer containing titanium as a main component and a copper layer containing copper as a main component which is formed on the titanium layer, for example. The dimensions of the first electrode 20$a$, the second electrode 20$b$, and the connection wiring 20$c$ in the thickness direction Z are about 0.2 to 0.8 μm, for example.

The first electrode 20$a$ (the common electrode) is a site that is electrically opposite in polarity to the plurality of second electrodes 20$b$ (the individual electrodes) when a printer into which the thermal print head is incorporated is used. The common electrode has the first electrode 20$a$, which is a plurality of comb-tooth parts, and the wiring layer 12, which is a common part connecting the plurality of comb-tooth parts in common. The wiring layer 12 as the common part is formed in the main scanning direction Y along the top of the convex part 11 of the substrate 10. Each comb-tooth part has a strip shape extending in the sub-scanning direction X on the insulating layer 17 which is formed on the heat storage layer 16. When viewed along the thickness direction Z, the upstream tip of each comb-tooth part faces the tip of each second electrode 20$b$ and is spaced apart at a predetermined interval on the downstream side along the sub-scanning direction X from the tip of each second electrode 20$b$.

As viewed along the thickness direction Z, upstream connection wiring 20$d$ is formed at both ends of the single substrate 100 in the main scanning direction Y and is formed on the insulating layer 17 which is formed on the heat storage layer 16. The wiring layer 12 formed below the heat storage layer 16 is electrically connected to the connection wiring 20$d$ formed on the heat storage layer 16 by means of the connection wiring 20$c$ which is formed at both ends of the single substrate 100 in the main scanning direction Y as viewed along the thickness direction Z. The connection wiring 20$d$ extends on the upstream side in the sub-scanning direction X (the upper right side in FIG. 1). The connection wiring 20$d$ is exposed from the protective film 22 on the upstream side in the sub-scanning direction X. The part of the connection wiring 20$d$ exposed from the protective film 22 forms a heating pad part 20$d$1 to which the heating voltage is supplied. The heating voltage is applied to each heating resistive part 18$a$ when necessary.

The individual second electrodes 20$b$ have a strip shape that extends substantially in the sub-scanning direction X and are not conductive with one another. Therefore, different potentials are individually given to individual second electrodes 20*b* when a printer into which the thermal print head is incorporated is used. The individual pad part 20*b*1 is formed at an end of each second electrode 20*b*. The individual pad part 20*b*1 and the heating pad part 20*d*1 are exposed from the protective film 22 on the upstream side in the sub-scanning direction X. An upstream end of each individual pad part 20*b*1 and the ends of the wiring layer 12 along the main scanning direction Y shown in FIG. 1 (in addition, FIGS. 17 and 19 which will be described later) are both located inside the ends of the substrate 10 at a certain distance (for example, 0.5 mm).

In the past, an electrode which has a strip shape and extends in the sub-scanning direction X has two adjacent sections having a folded shape. The two adjacent sections are connected to two adjacent heating resistive parts, respectively. These two adjacent heating resistive parts form one printing dot. The center-to-center spacing (the dot pitch) of the print dots formed is the center-to-center spacing between the two adjacent heating resistive parts and two heating resistive parts adjacent to the two adjacent heating resistive parts. For this reason, it has been difficult to reduce the center-to-center spacing and form a high-definition electrode pattern. Accordingly, it has not been possible to perform high-definition printing on a printing medium.

However, in the single substrate 100 used in a thermal print head 200 (see FIG. 39) of the present embodiment, the common electrode is formed of the first electrode 20*a* and the wiring layer 12, and the individual electrode is formed of the second electrode 20*b*. When viewed along the thickness direction Z, a part of the common electrode is superimposed with the individual electrode with the heat storage layer 16 therebetween in the thickness direction Z. Therefore, the electrodes do not need to have a folded shape and high integration of the common electrode and the individual electrode is possible. In addition, the center-to-center spacing (the electrode pitch) of adjacent electrodes is equal to the dot pitch. Therefore, it is possible to reduce the electrode pitch and form a high-definition electrode pattern. Accordingly, high-definition printing can be performed on the printing medium. The dot pitch can be 63.5 μm or less, and further 42.3 μm or less, for example.

The protective film 22 covers the first electrode 20*a*, the second electrode 20*b*, and the like, and protects the first electrode 20*a*, the second electrode 20*b*, and the like from wear, corrosion, oxidation, and the like. The protective film 22 can be formed by using insulating materials, and silicon nitride, silicon oxide, and the like can be used, for example. The dimension of the protective film 22 in the thickness direction Z is about 3 to 8 μm, for example. The individual pad part 20*b*1 and the heating pad part 20*d*1 on the upstream side in the sub-scanning direction X are exposed from the protective film 22.

A description will be given regarding a manufacturing method of the thermal print head 200 (see FIG. 39) of the present embodiment. Each drawing showing the manufacturing method may show the substrate 10 corresponding to the single substrate 100 for convenience. In practice, each process is performed for one ceramic substrate and one semiconductor substrate, each having a plurality of regions corresponding to a plurality of substrates 10.

Figure 3:
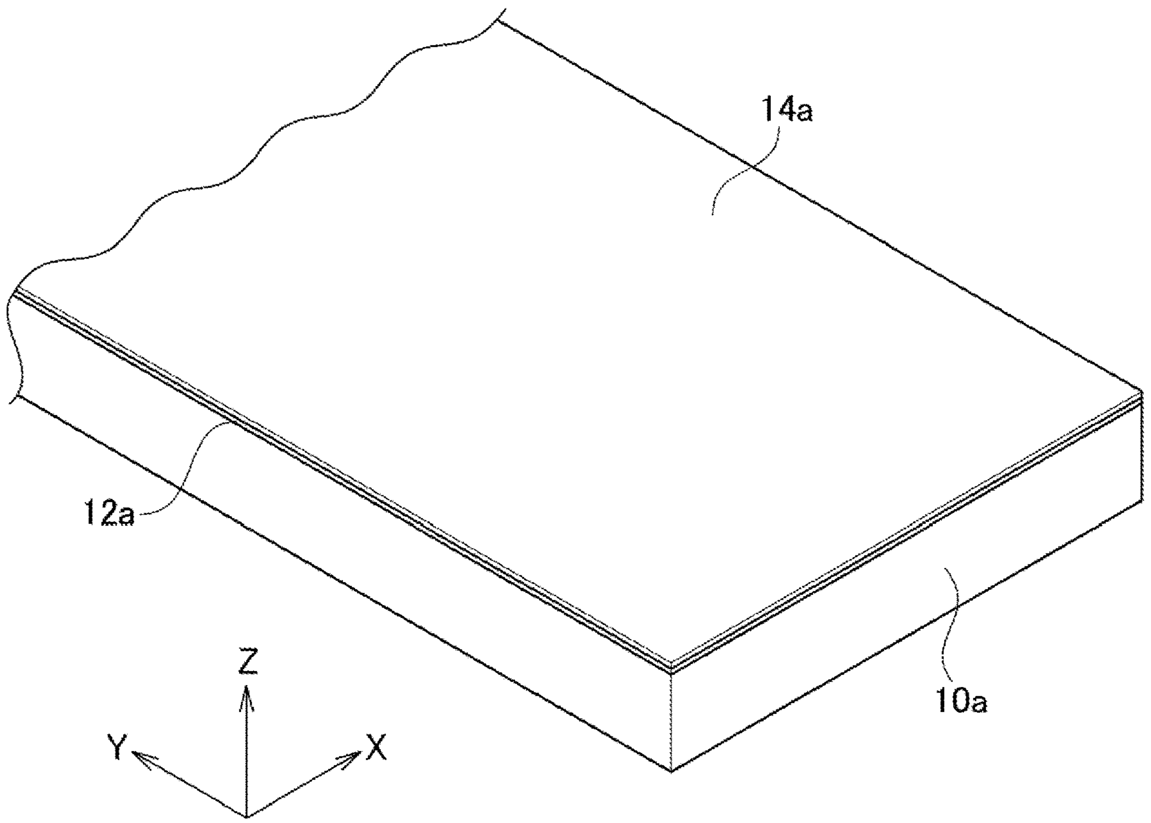
FIG. 3 is a perspective view for explaining a manufacturing method of a thermal print head according to a first embodiment (part 1).
Figure 4:
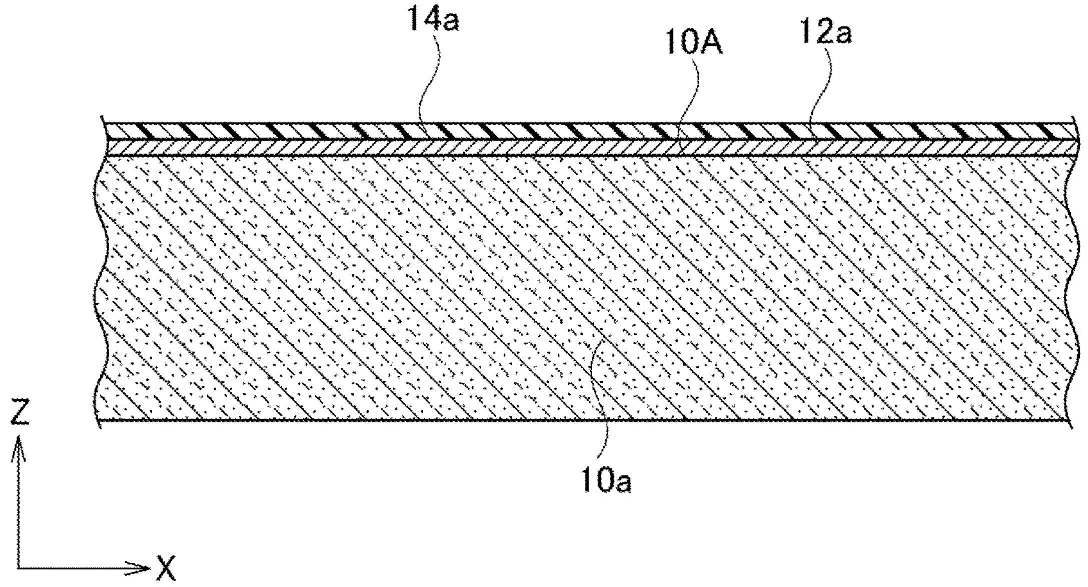
FIG. 4 is a cross-sectional view of FIG. 3.

As shown in FIGS. 3 and 4, first, a single semiconductor substrate (for example, a silicon substrate) having a plurality of substrates 10*a* is prepared. Then, after forming a conductive film 12*a* serving as the wiring layer 12 on the substrate 10*a*, an insulating film 14*a* serving as the insulating layer 14 is formed on the conductive film 12*a*. The substrate 10*a*, the conductive film 12*a*, and the insulating film 14*a* can be formed by using the materials exemplified in the above described substrate 10, wiring layer 12, and insulating layer 14. The conductive film 12*a* can be formed by using titanium or the like using sputtering, for example. The insulating film 14*a* can be formed by using silicon oxide or the like using sputtering, for example.

Figure 5:
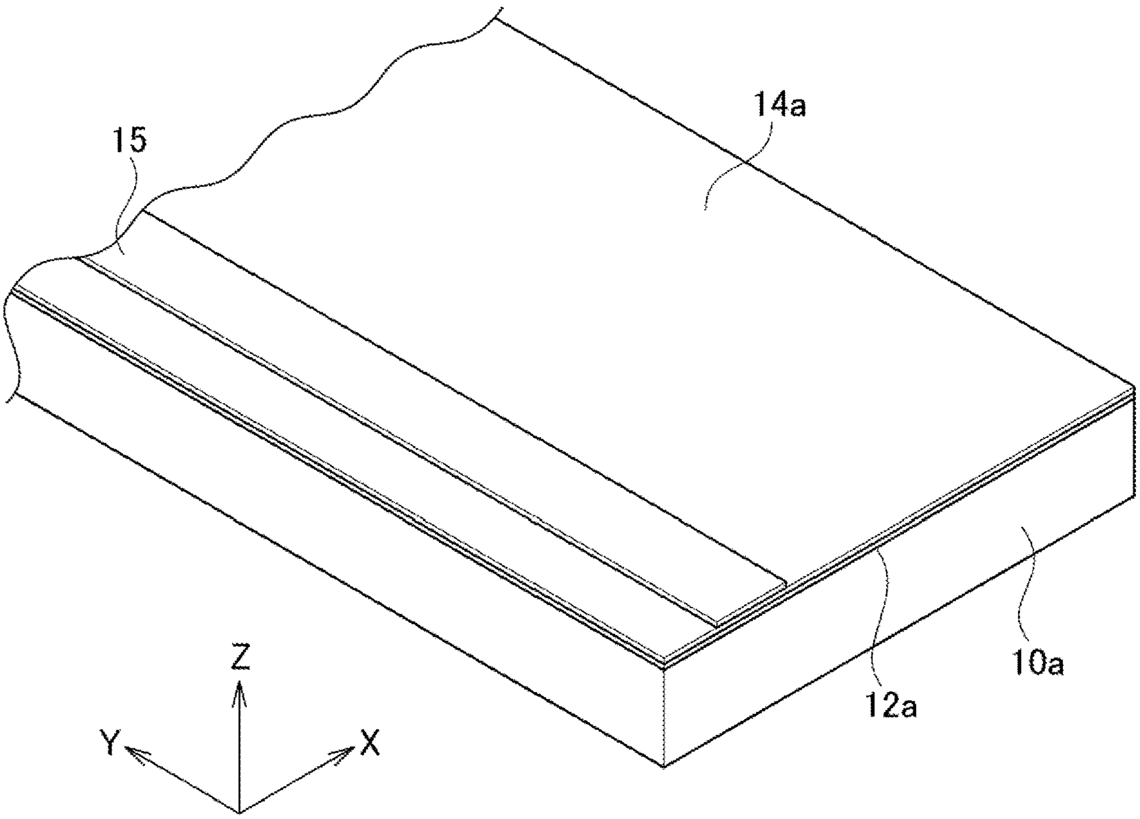
FIG. 5 is a perspective view for explaining a manufacturing method of a thermal print head according to a first embodiment (part 2).
Figure 6:
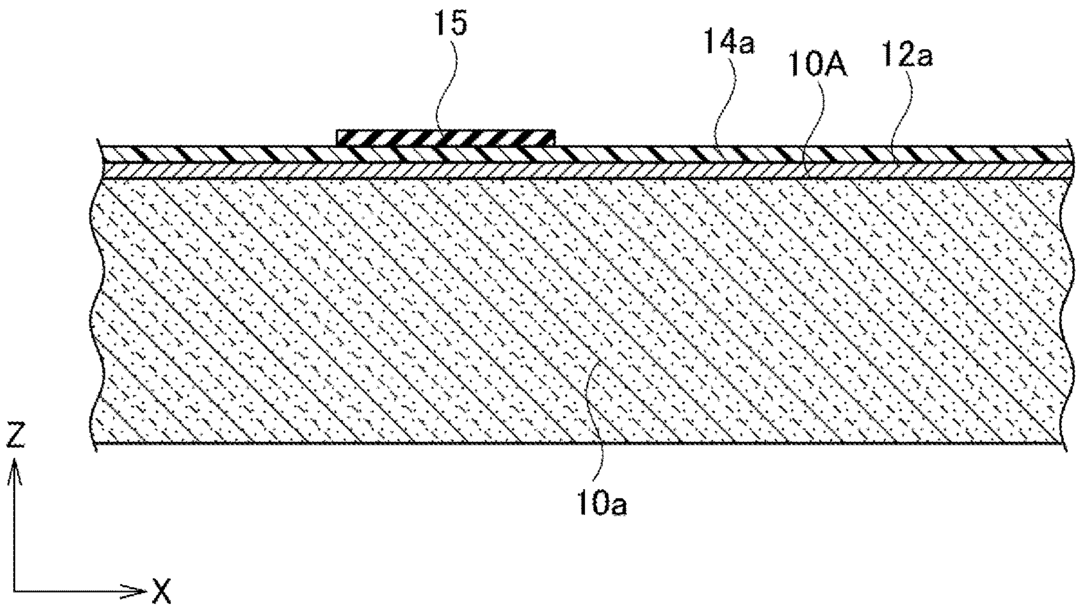
FIG. 6 is a cross-sectional view of FIG. 5.

Then, as shown in FIGS. 5 and 6, a resist pattern 15 is formed on the insulating film 14*a*.

Figure 7:
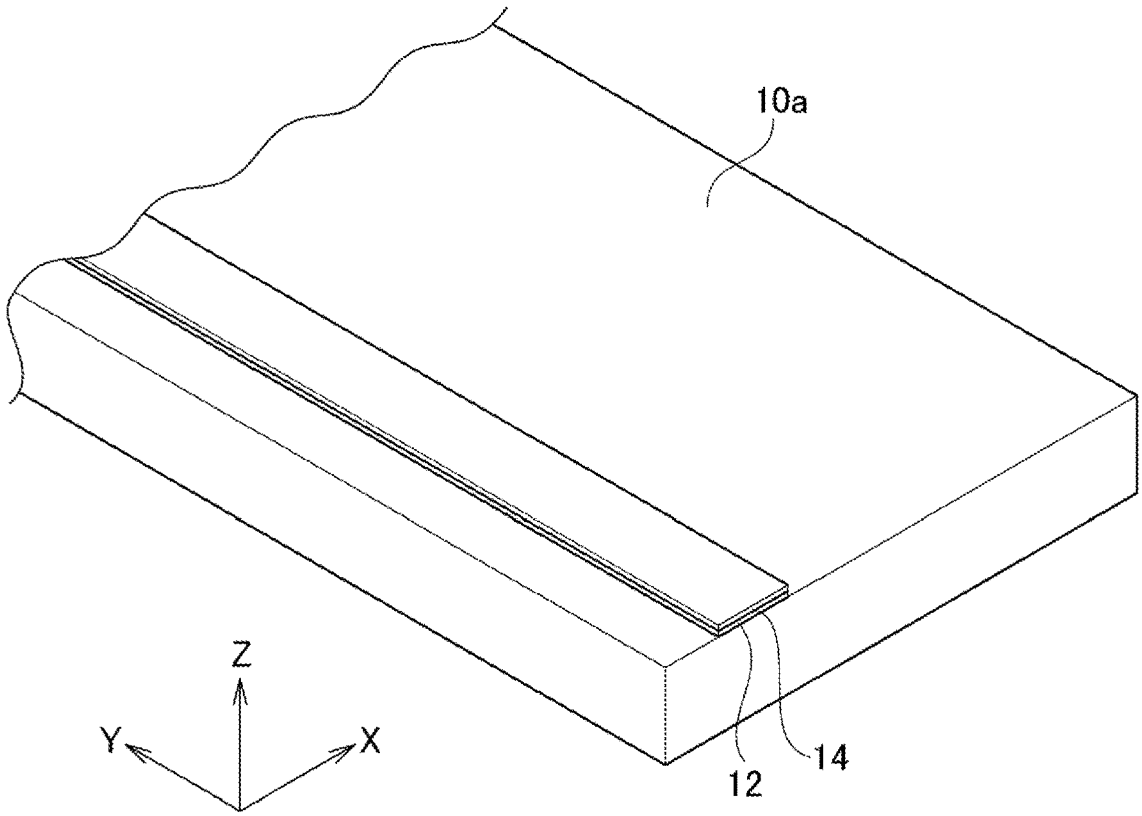
FIG. 7 is a perspective view for explaining a manufacturing method of a thermal print head according to a first embodiment (part 3).
Figure 8:
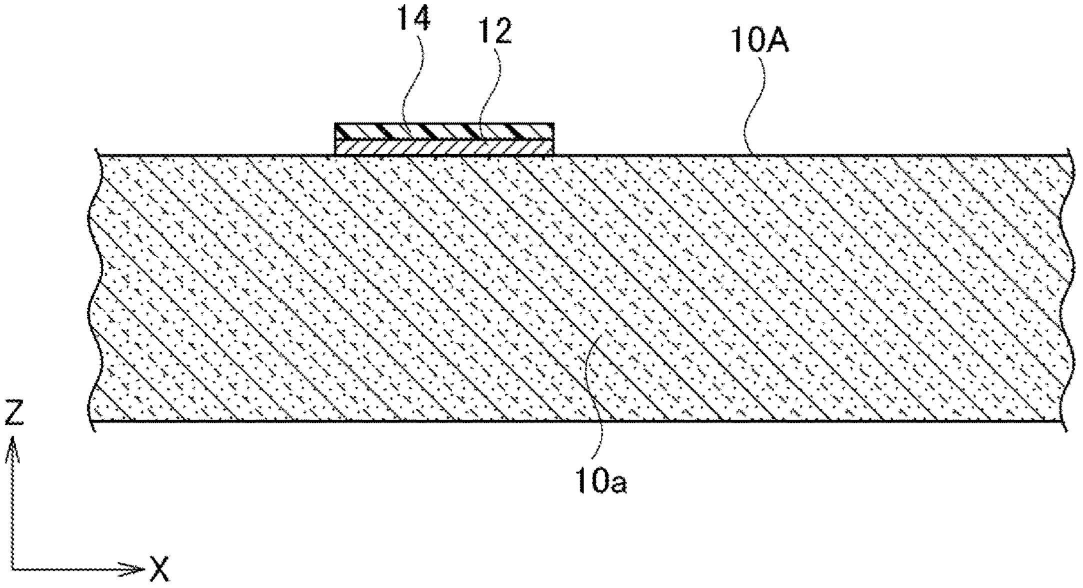
FIG. 8 is a cross-sectional view of FIG. 7.

Then, as shown in FIGS. 7 and 8, by using the resist pattern 15 as a mask, a part of the conductive film 12*a* and a part of the insulating film 14*a* are removed to form the wiring layer 12 and the insulating layer 14. Then, the resist pattern 15 is peeled off. The peeling can be performed by using hydrofluoric acid, for example.

Figure 9:
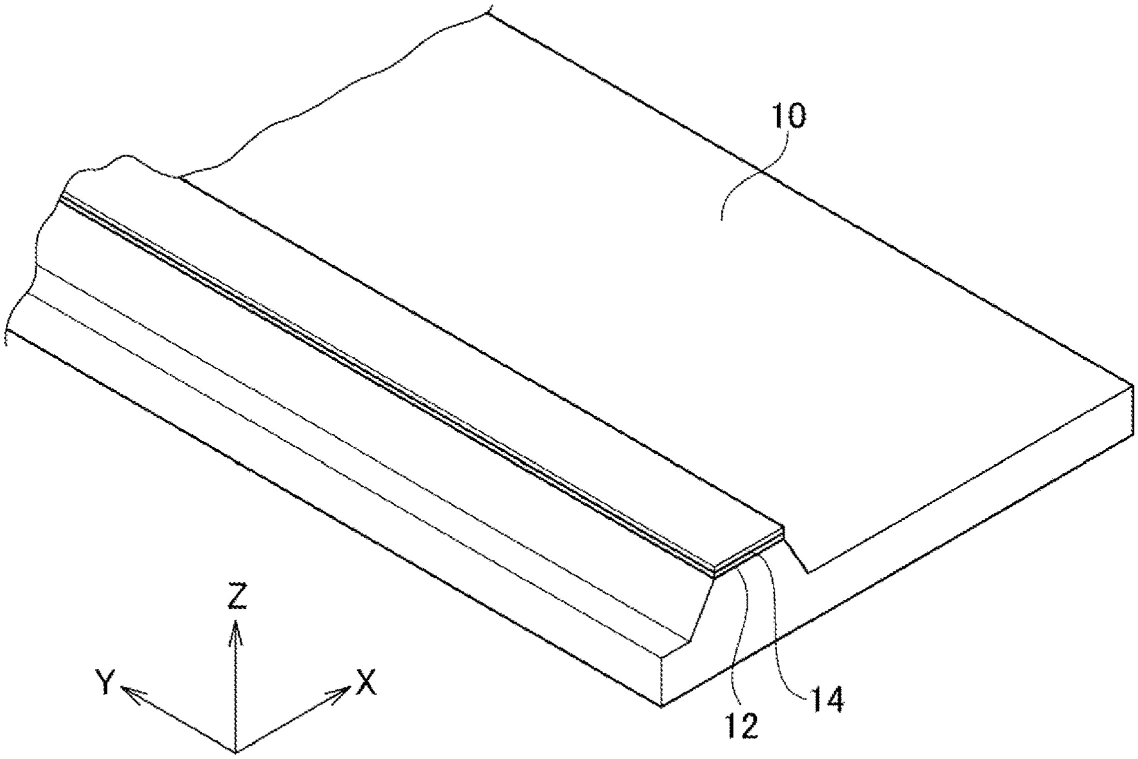
FIG. 9 is a perspective view for explaining a manufacturing method of a thermal print head according to a first embodiment (part 4).
Figure 10:
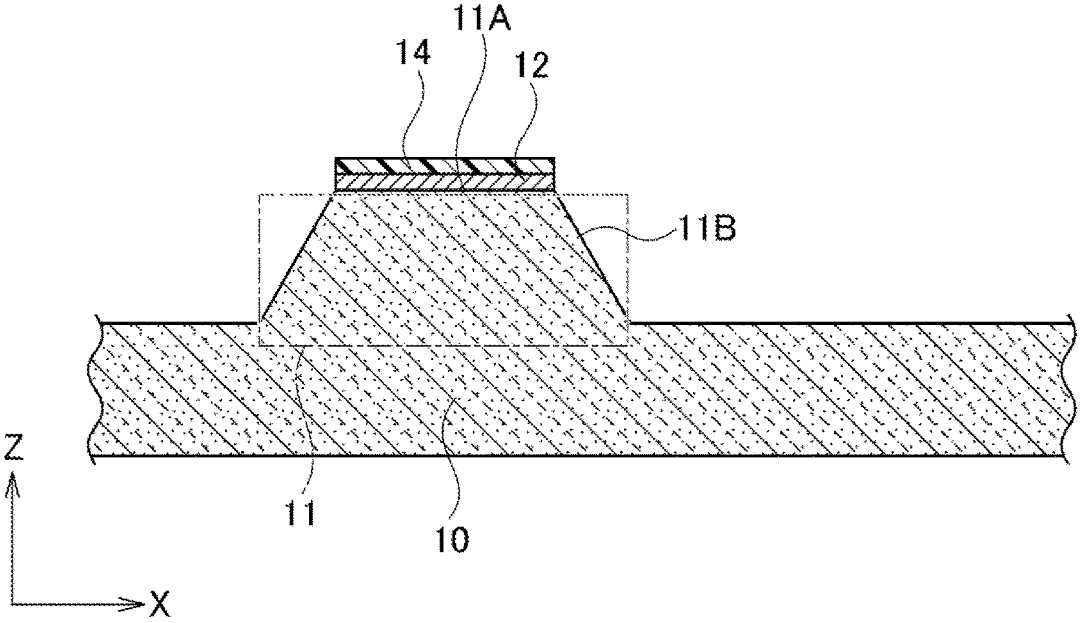
FIG. 10 is a cross-sectional view of FIG. 9.

Next, as shown in FIGS. 9 and 10, by using the wiring layer 12 and the insulating layer 14 as a mask, a part of the substrate 10*a* is removed to form the substrate 10 having the convex part 11. A part of the substrate 10*a* can be removed by means of anisotropic etching using potassium hydroxide, for example. By performing this process, the convex part 11 is formed having a trapezoidal cross-sectional shape when viewed along the main scanning direction Y. The convex part 11 has a top surface 11A formed of a flat surface parallel to the upper surface of the substrate 10. On the top surface 11A, the wiring layer 12 and the insulating layer 14 are formed in this order from the bottom. In some cases, an insulating layer (not shown) is formed between the top surface 11A and the wiring layer 12. In this case, first, before forming the conductive film 12*a*, a part of the substrate 10*a* is removed to form the substrate 10 having the convex part 11, and then the insulating layer, the wiring layer 12, and the insulating layer 14 are formed on the substrate 10 having the convex part 11. The insulating layer may be provided only on the top surface 11A, on the top surface 11A and the side surfaces 11B of the convex part 11, or on the entire upper surface 10A of the substrate 10.

Figure 11:
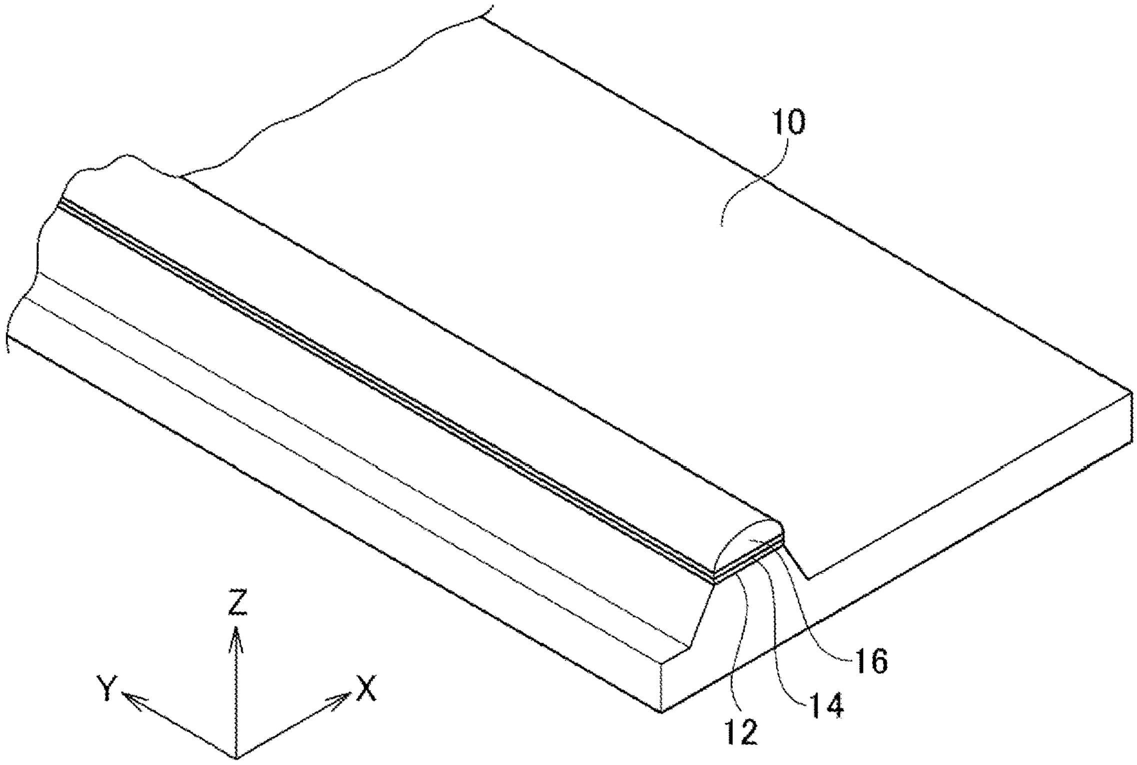
FIG. 11 is a perspective view for explaining a manufacturing method of a thermal print head according to a first embodiment (part 5).
Figure 12:
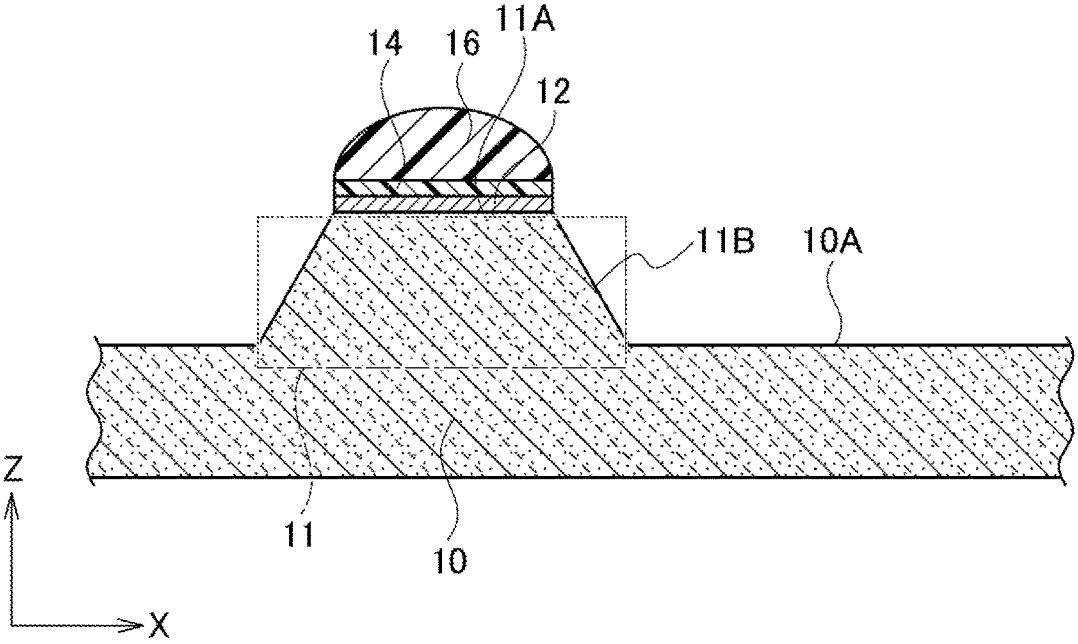
FIG. 12 is a cross-sectional view of FIG. 11.

Then, as shown in FIGS. 11 and 12, the heat storage layer 16 is formed on the insulating layer 14. The heat storage layer 16 can be formed by performing a firing treatment after discharging glass paste by using a dispenser, for example. The firing treatment is performed at 850 to 1200° C. for 1 to 5 hours, for example.

Figure 13:
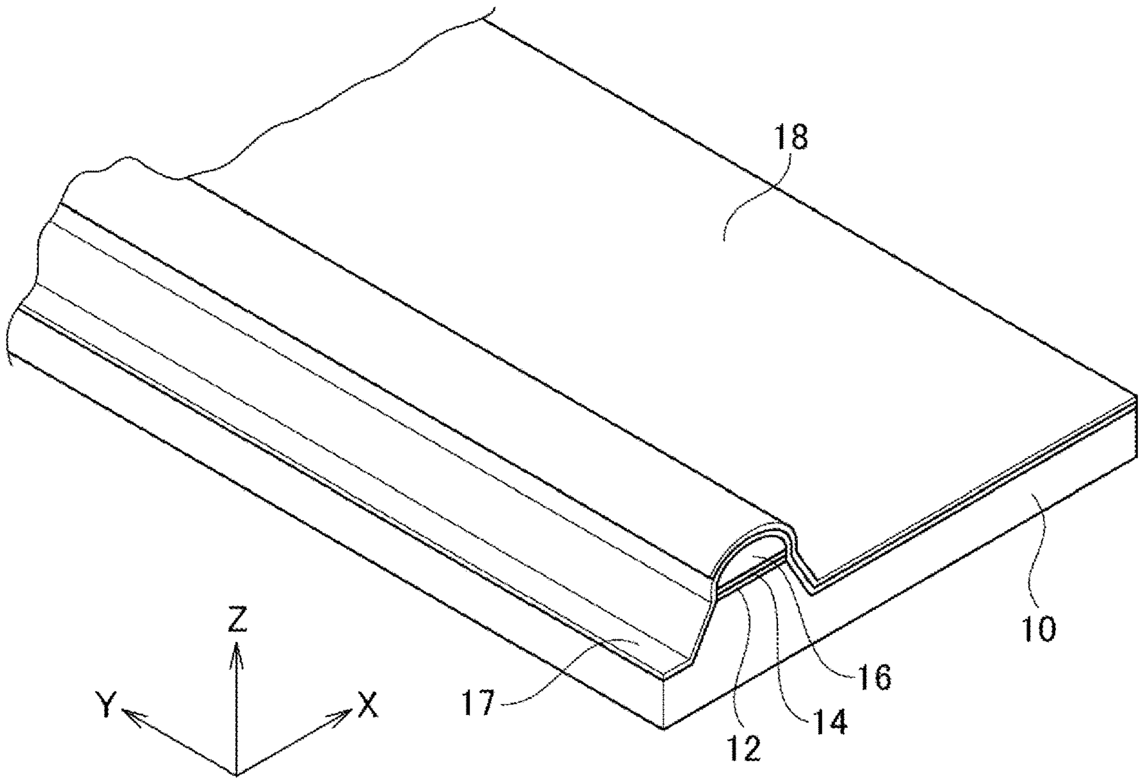
FIG. 13 is a perspective view for explaining a manufacturing method of a thermal print head according to a first embodiment (part 6).
Figure 14:
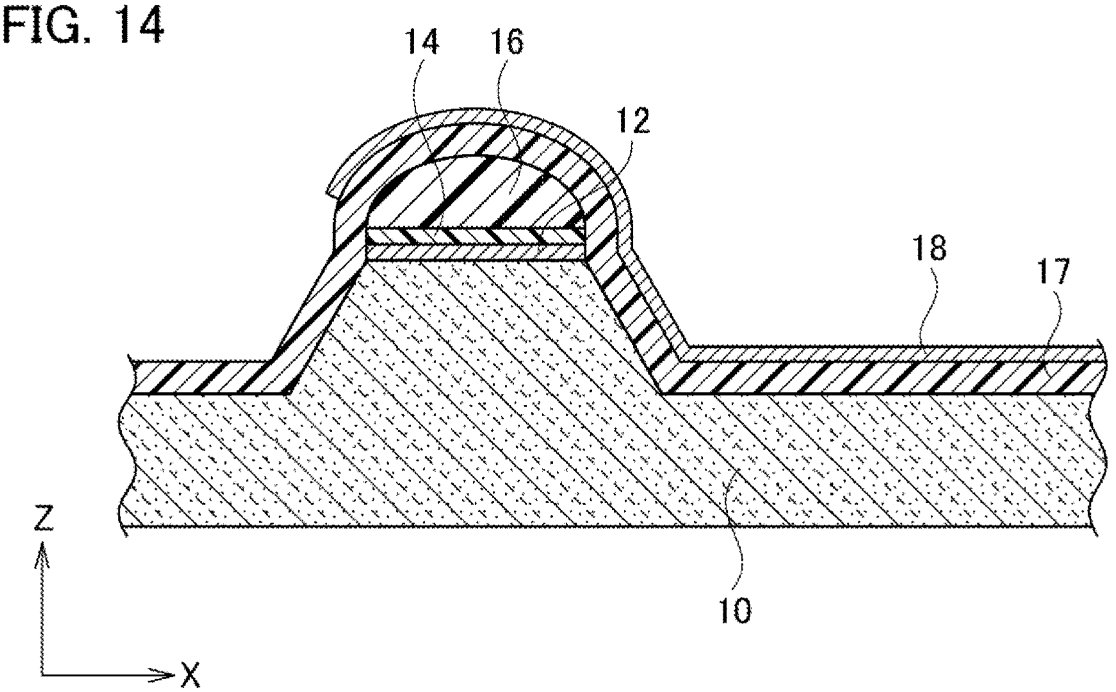
FIG. 14 is a cross-sectional view of FIG. 13.

Next, as shown in FIGS. 13 and 14, the insulating layer 17 and the resistor layer 18 are formed above the substrate 10 and on the heat storage layer 16. The insulating layer 17 can be formed by using silicon oxide or the like which is obtained by depositing tetraethoxysilane (TEOS) as a raw material by means of CVD, for example. The resistor layer 18 can be formed by using tantalum nitride or the like using sputtering, for example.

Figure 15:
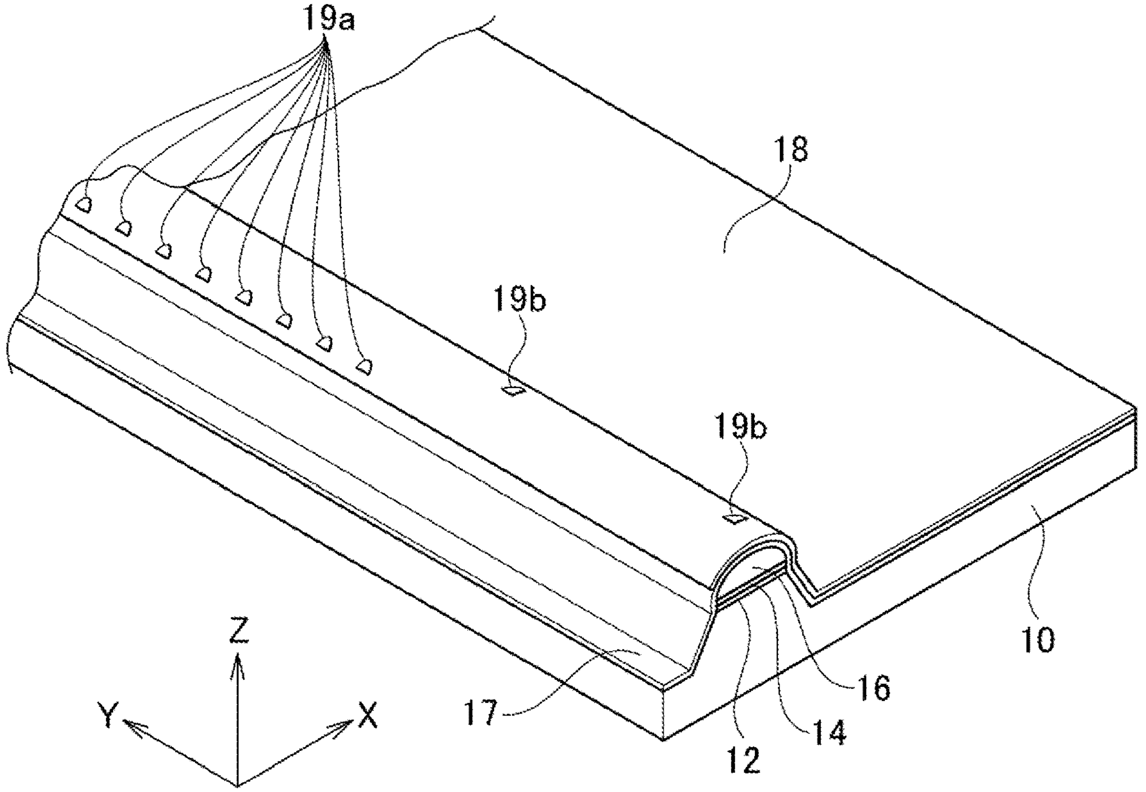
FIG. 15 is a perspective view for explaining a manufacturing method of a thermal print head according to a first embodiment (part 7).
Figure 16:
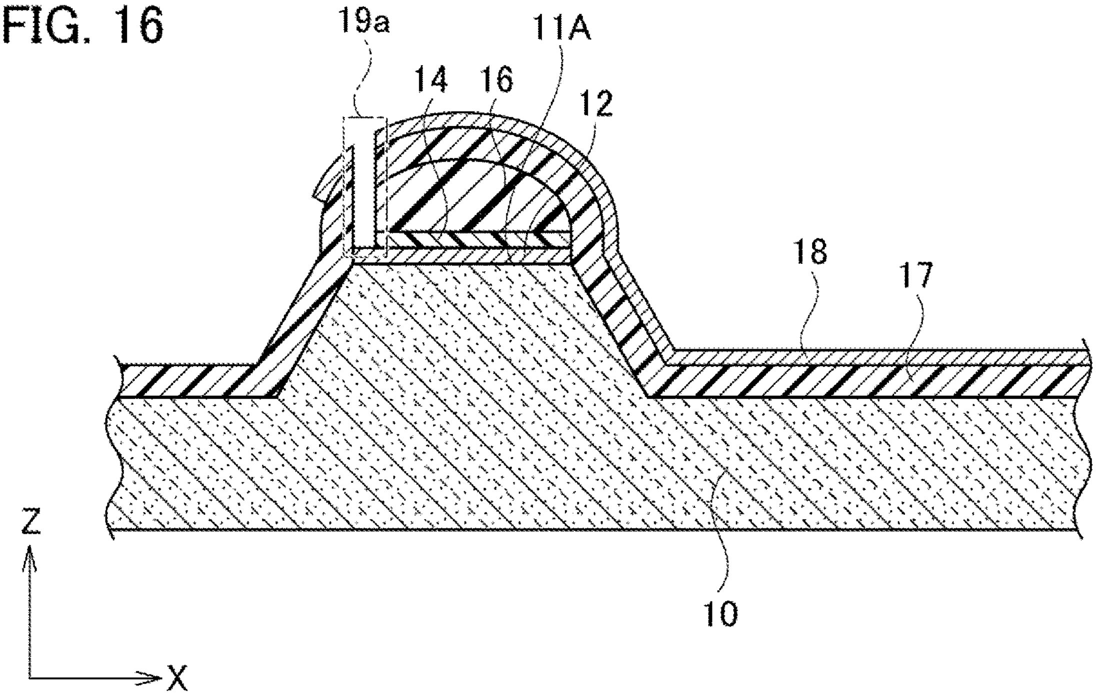
FIG. 16 is a cross-sectional view of FIG. 15.

Next, as shown in FIGS. 15 and 16, openings 19*a* and openings 19*b* are formed in the insulating layer 14, the heat storage layer 16, and the resistor layer 18. The openings 19*a* and the openings 19*b* are formed such that parts of the upper surface of the wiring layer 12 are exposed. As shown in FIG. 15, the openings 19*a* and the openings 19*b* are not aligned when viewed along the sub-scanning direction X. Therefore, FIG. 16 does not show the openings 19*b*. In the sub-scanning direction X, the openings 19*b* are present at positions at which the line symmetrical position across the center line of the top surface 11A of the convex part 11 with respect to the openings 19*a* shown in FIG. 16 extends to both end sides of the substrate 10 along the main scanning direction Y.

Figure 17:
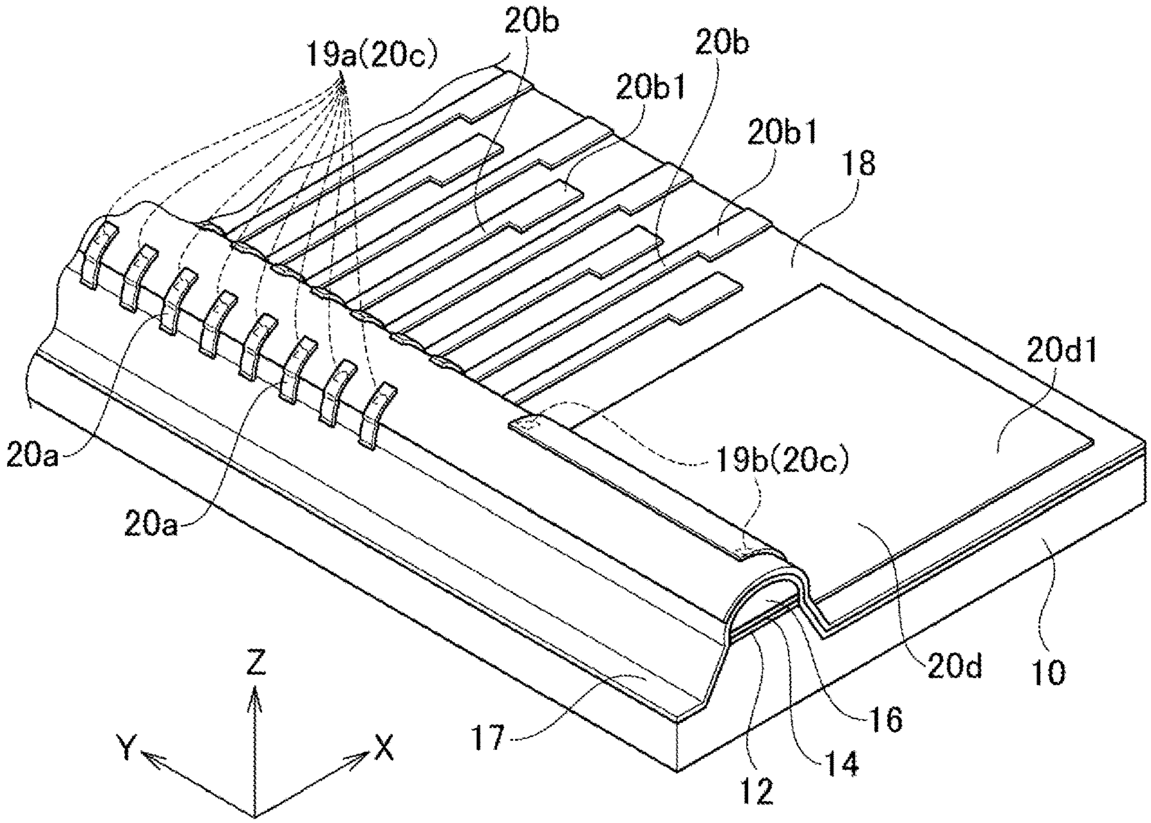
FIG. 17 is a perspective view for explaining a manufacturing method of a thermal print head according to a first embodiment (part 8).
Figure 18:
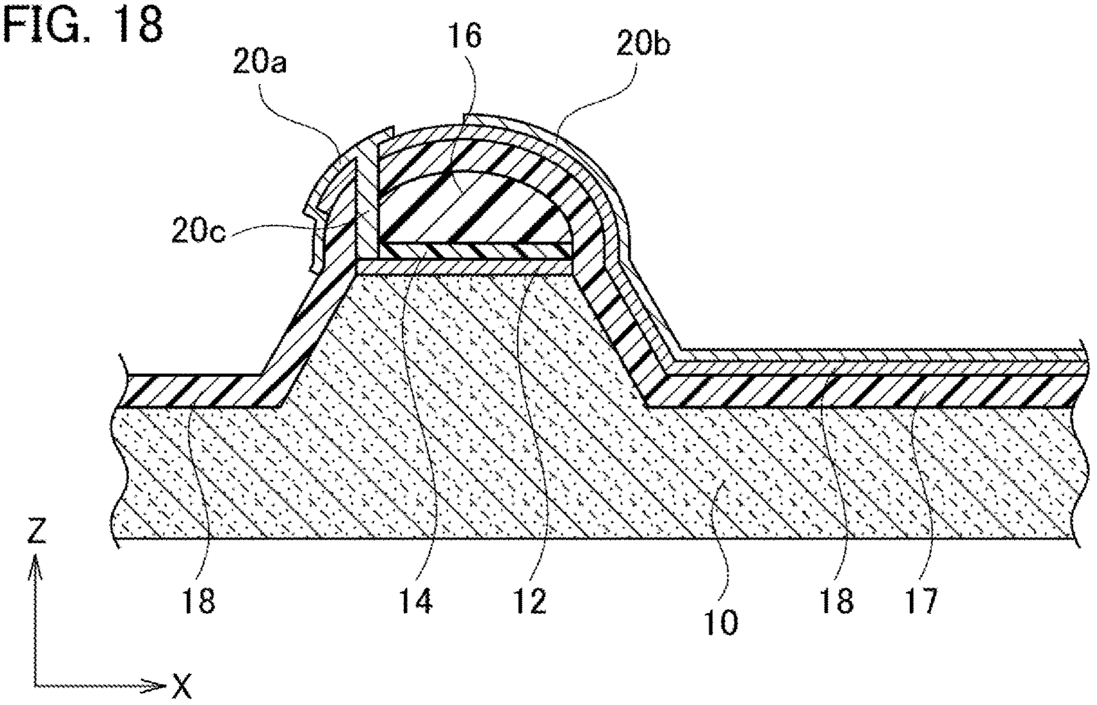
FIG. 18 is a cross-sectional view of FIG. 17.

Next, as shown in FIGS. 17 and 18, the following are formed by means of photolithography, for example: the connection wiring 20*c* formed in the opening 19*a*; and the first electrode 20*a* which is electrically connected to the wiring layer 12 via the connection wiring 20*c*. The connection wiring 20*c* may be formed on the inner wall surface of the opening 19*a*, or the connection wiring 20*c* may be formed to fill the inside of the opening 19*a*. In the same process, as viewed along the thickness direction Z, the following are formed: the second electrode 20*b* that faces the tip of the first electrode 20*a* at a predetermined interval along the sub-scanning direction X; the connection wiring 20*c* formed in the opening 19*b*; and the connection wiring 20*d* which is electrically connected to the wiring layer 12 via the connection wiring 20*c*. As viewed along the thickness direction Z, between the tip of the first electrode 20*a* and the tip of the second electrode 20*b*, the resistor layer 18 is exposed from the first electrode 20*a* and the second electrode 20*b*. After the end of this process, the wiring layer 12 formed below the insulating layer 14 is formed below the heat storage layer 16. The first electrode 20*a* and the second electrode 20*b* are formed above the heat storage layer 16. Therefore, the wiring layer 12 corresponds to the lower layer wiring, and the first electrode 20*a* and the second electrode 20*b* correspond to the upper layer wiring.

The first electrode 20*a* functions as a part of the common electrode and the second electrode 20*b* functions as the individual electrode. As viewed along the thickness direction Z, the wiring layer 12 (lower layer wiring), which is a part of the common electrode, is superimposed with the second electrode 20*b* (upper layer wiring), which is the individual electrode. Therefore, both the common electrode and the individual electrode do not need to have a folded shape and high integration of the common electrode (the first electrode 20*a*) and the individual electrode (the second electrode 20*b*) becomes possible. Therefore, it is possible to reduce the electrode pitch and form a high-definition electrode pattern. Accordingly, high-definition printing can be performed on a printing medium.

In addition, in the single substrate 100 used in the thermal print head 200 (see FIG. 39) of the present embodiment, when viewed along the main scanning direction Y, the midpoint between the tip of the first electrode 20*a* and the tip of the second electrode 20*b* is located further on the downstream side (the first electrode 20*a* side) than the central part of the heat storage layer 16 in the sub-scanning direction X. That is, the region of the resistor layer 18 that is not superimposed with the first electrode 20*a* and the second electrode 20*b* (the region in which the upper surface of the resistor layer 18 is exposed from the first electrode 20*a* and the second electrode 20*b*) is located further on the downstream side in the sub-scanning direction X than the central part of the heat storage layer 16. With such a configuration, when performing printing on a printing medium, the printing medium can be smoothly sent to the downstream side in the sub-scanning direction X. Accordingly, printing can be performed on the printing medium at a higher speed and with higher-definition. The configuration is not limited to the above configuration, and the location of the region of the resistor layer 18 not superimposed with the first electrode 20*a* and the second electrode 20*b* may be in the central part of the heat storage layer 16 as viewed along the main scanning direction Y.

Figure 19:
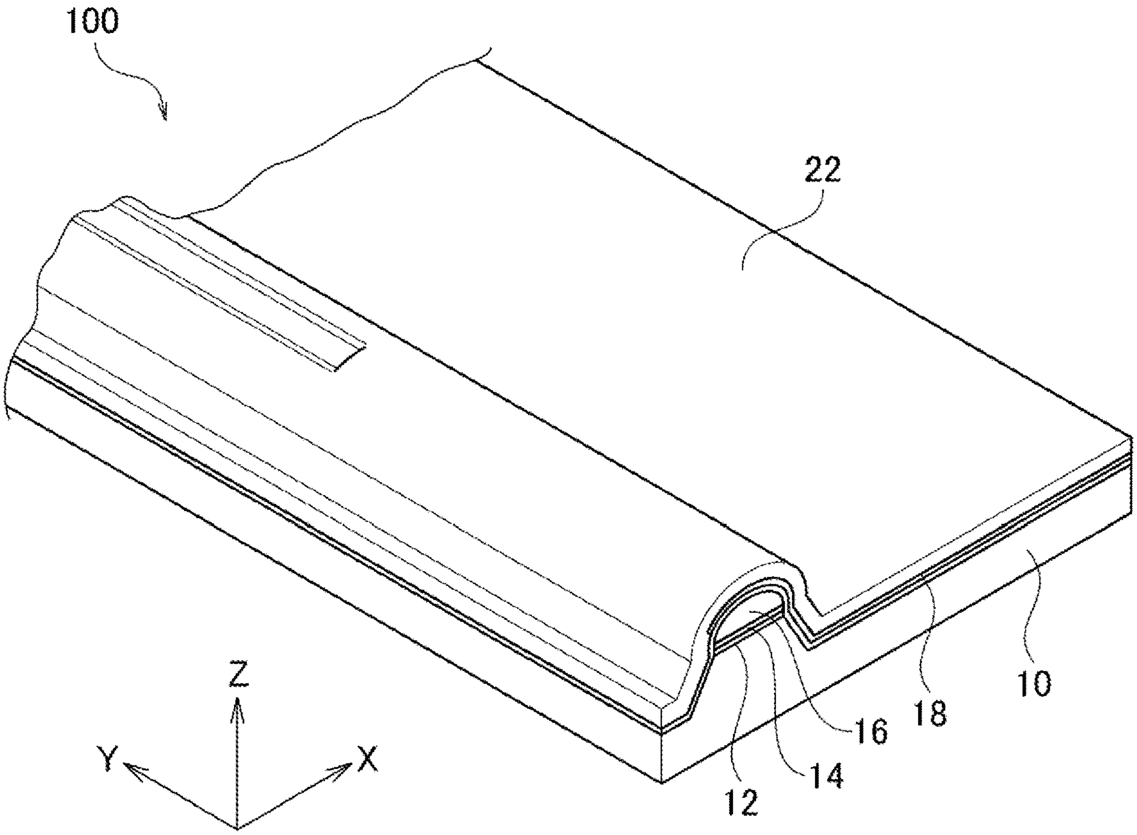
FIG. 19 is a perspective view for explaining a manufacturing method of a thermal print head according to a first embodiment (part 9).
Figure 20:
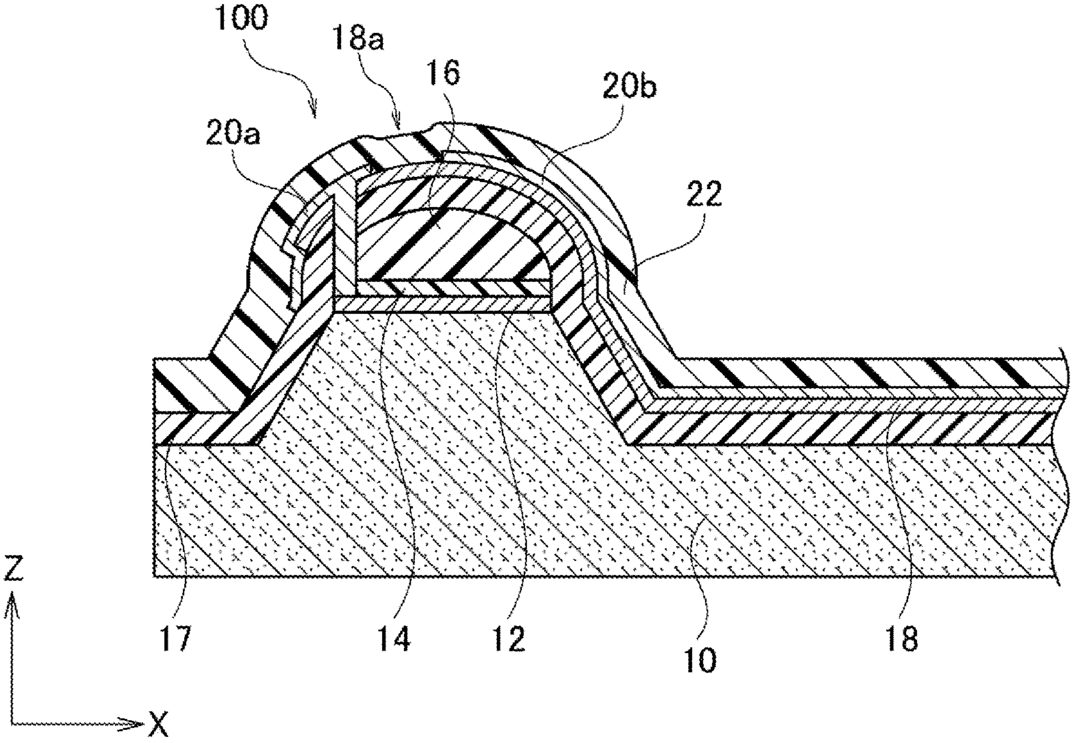
FIG. 20 is a cross-sectional view of FIG. 19.

Next, as shown in FIGS. 19 and 20, the protective film 22 is formed. The protective film 22 can be formed by using silicon nitride or the like using CVD, for example.

Next, the semiconductor substrate is cut by using a dicer to fabricate the single substrate 100, which is a single substrate that has been cut from the semiconductor substrate, for example. Cutting is performed along the main scanning direction Y and the sub-scanning direction X. The position where the semiconductor substrate is cut along the main scanning direction Y is preferably slightly downstream from the point where the protective film 22 shown in FIG. 20 becomes flat on the downstream side.

Figure 39:
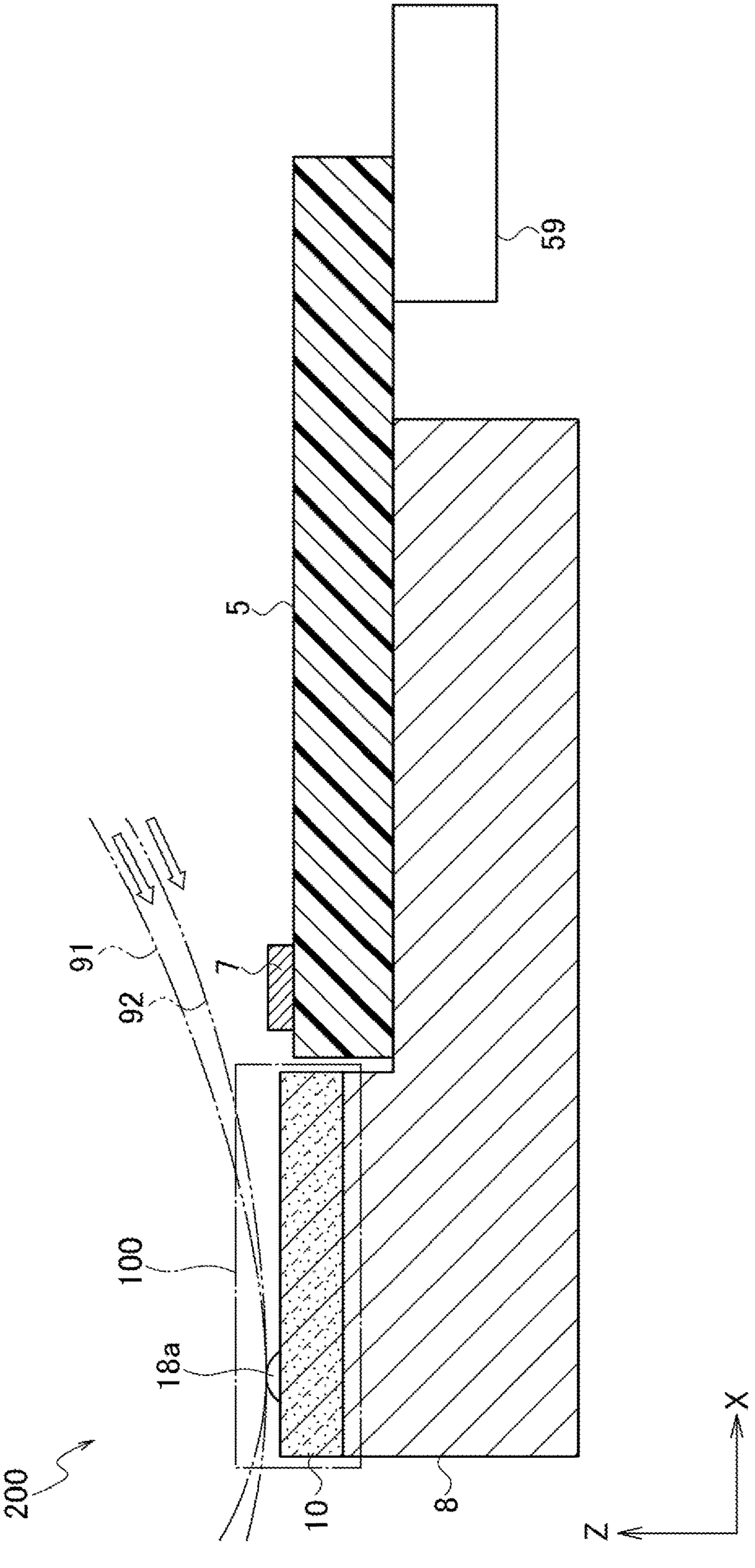
FIG. 39 is a cross-sectional view for explaining a thermal print head.

Next, as shown in FIG. 39, the single substrate 100 is fixed on a heat dissipation member 8 by using an adhesive (not shown) or the like. By using screws (not shown) or the like, a connection substrate 5 on which a drive IC 7 and a connector 59 are mounted is fixed to the heat dissipation member 8.

Next, wiring is connected around the drive IC 7. Among pads of the drive IC 7, a pad for input and output to and from the outside and a pad of the connection substrate 5 are electrically connected by using wiring. Among the pads of the drive IC 7, a pad for the heating resistive part 18*a* and the individual pad part 20*b*1 (see FIG. 1) are electrically connected by using wiring. The heating pad part 20*d*1 (see FIG. 1) of the single substrate 100 and the heating pad of the connection substrate 5 are electrically connected by using a plurality of wires. FIG. 39 does not show each pad and each wire described above.

Next, a sealing resin (not shown) is formed on the upper surface of the single substrate 100 and the upper surface of the connection substrate 5 so as to include the connections between each pad and each wire, each wire, and the drive IC 7. A thermosetting resin such as an epoxy resin is used as the sealing resin, for example. The thermal print head 200 of the present embodiment can be manufactured by performing the above processes.

In addition, as a configuration of a single substrate of another thermal print head according to the present embodiment, a wiring layer may be configured to cover the upper surface and the side surfaces of the convex part of the substrate 10. The manufacturing method of the wiring layer will be described below.

Figure 21:
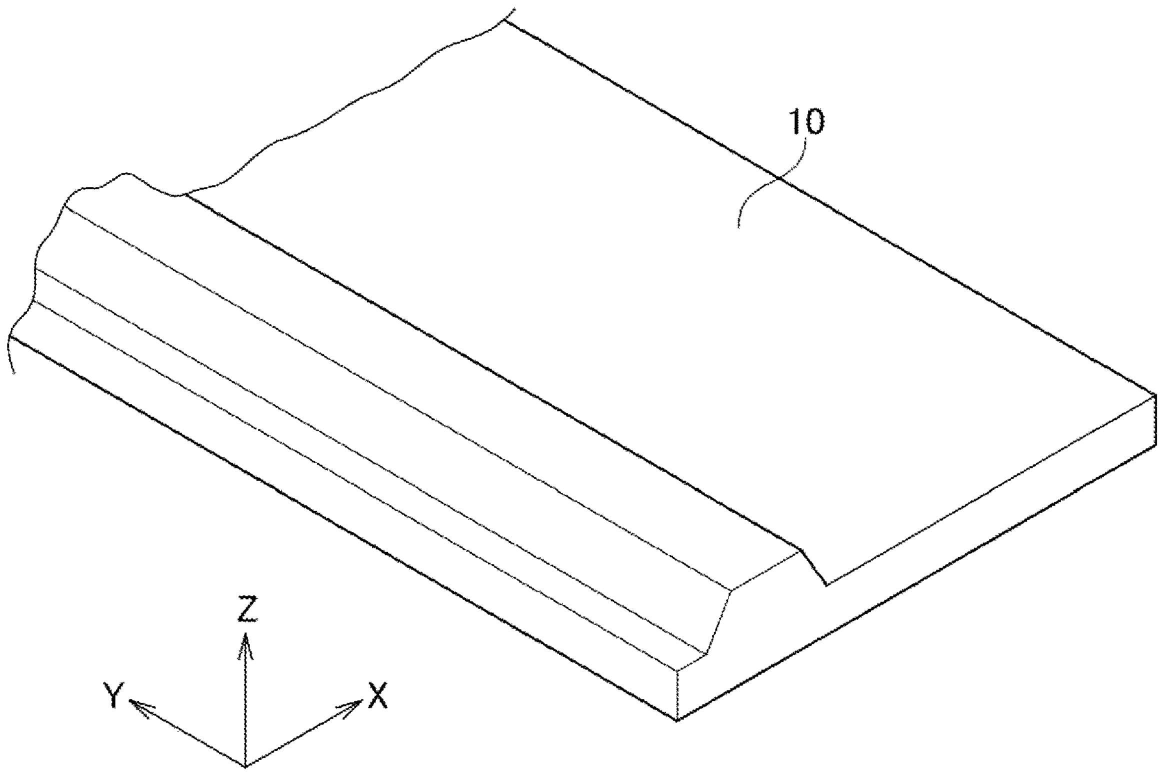
FIG. 21 is a perspective view for explaining a manufacturing method of another thermal print head according to a first embodiment (part 1).
Figure 22:
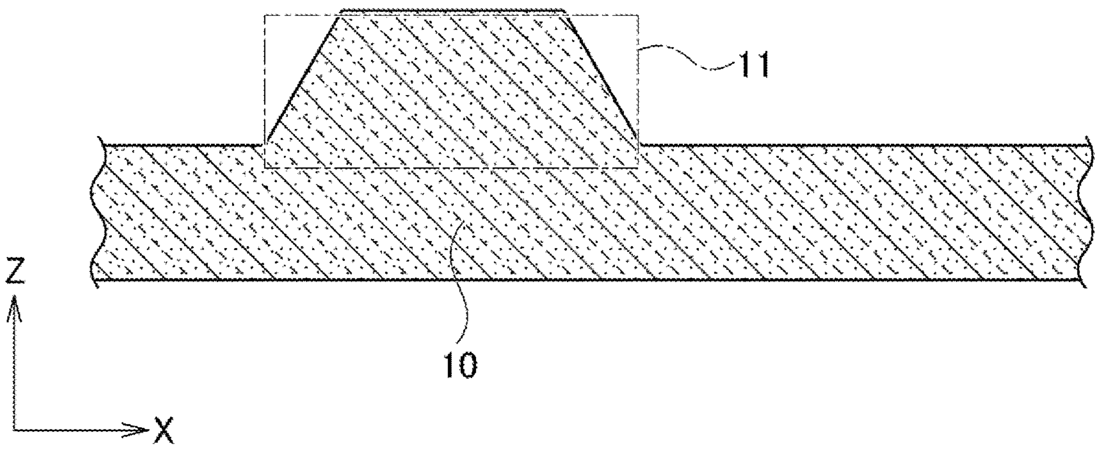
FIG. 22 is a cross-sectional view of FIG. 21.

As shown in FIGS. 21 and 22, a substrate 10 having a convex part 11 is prepared. The substrate 10 having the convex part 11 can be obtained by forming a resist pattern on the above described substrate 10*a*, using the resist pattern as a mask, and removing a part of the substrate 10*a* by means of anisotropic etching using potassium hydroxide, for example.

Figure 23:
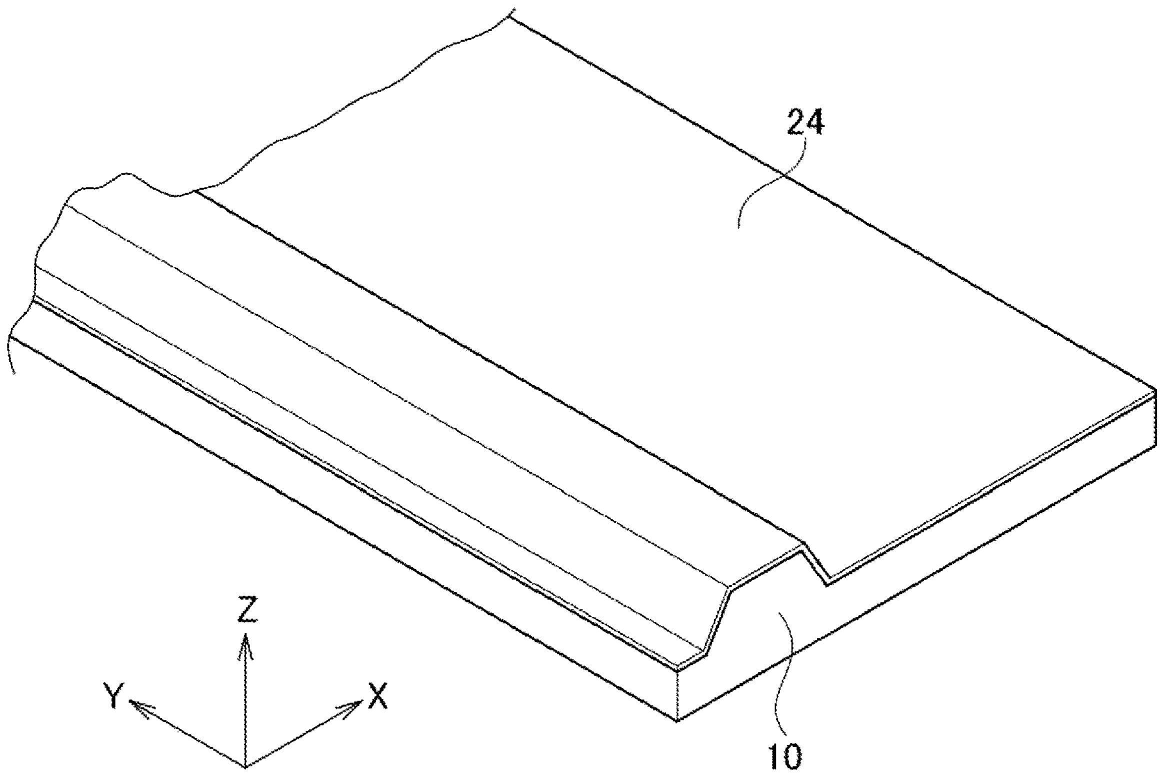
FIG. 23 is a perspective view for explaining a manufacturing method of another thermal print head according to a first embodiment (part 2).
Figure 24:
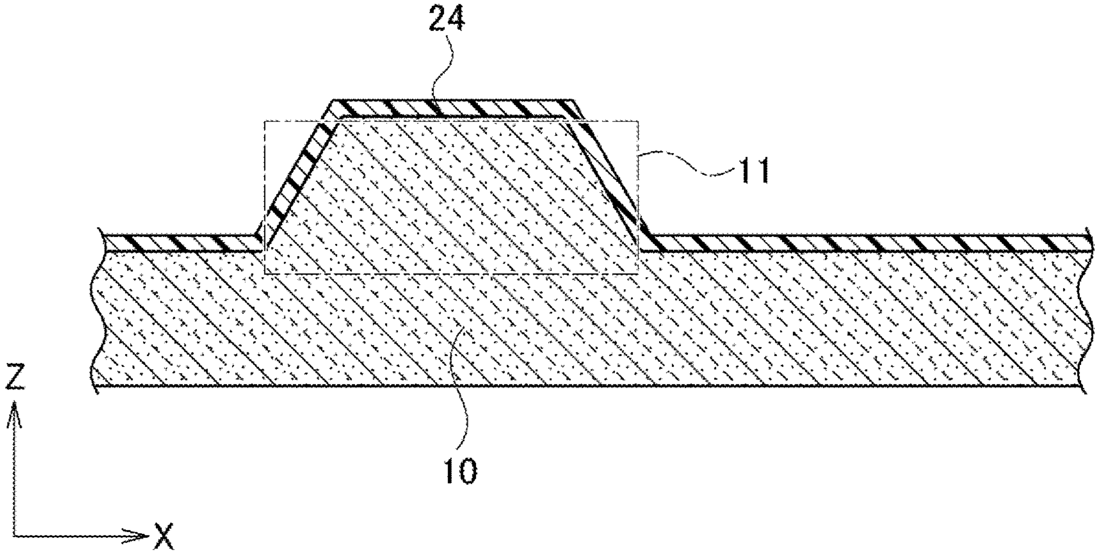
FIG. 24 is a cross-sectional view of FIG. 23.

Next, as shown in FIGS. 23 and 24, an insulating film 24 is formed on the substrate 10. The material and formation method exemplified in the above described insulating film 14*a* can be used for the insulating film 24.

Figure 25:
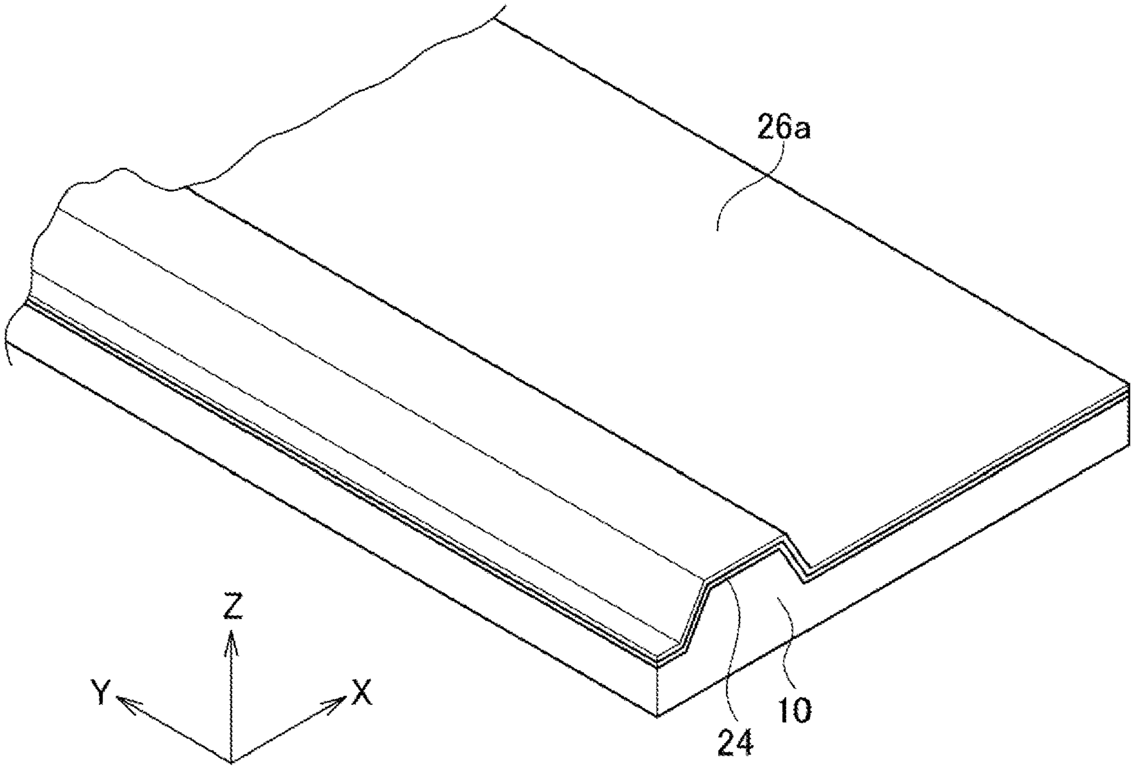
FIG. 25 is a perspective view for explaining a manufacturing method of another thermal print head according to a first embodiment (part 3).
Figure 26:
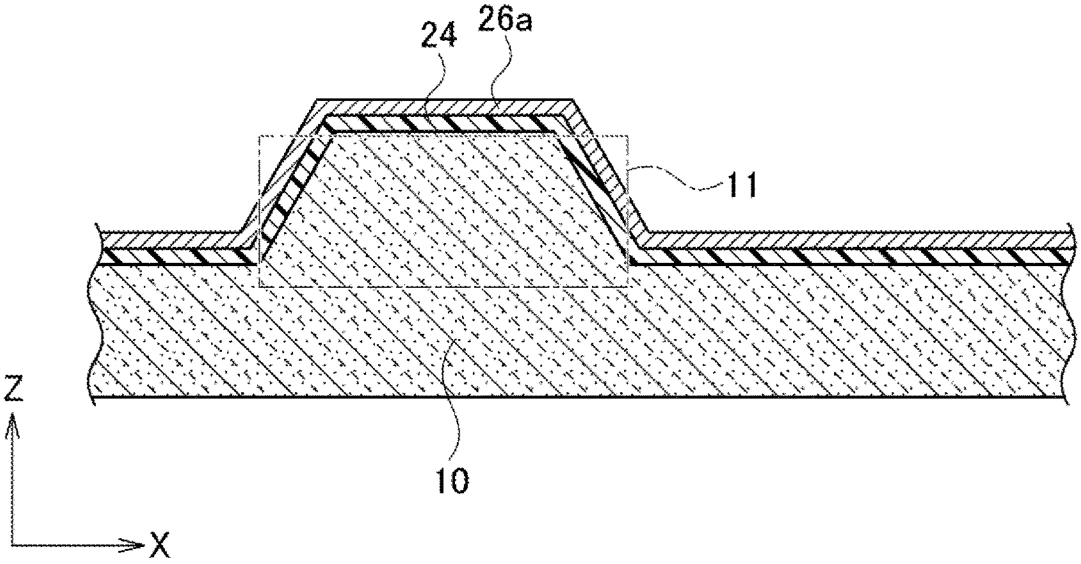
FIG. 26 is a cross-sectional view of FIG. 25.

Next, as shown in FIGS. 25 and 26, a conductive film 26*a* is formed on the insulating film 24. The conductive film 26*a* can be formed by using titanium, nickel, cobalt, sodium, magnesium, platinum, tungsten, molybdenum, tantalum, vanadium, zirconium, hafnium, and the like using sputtering.

Figure 27:
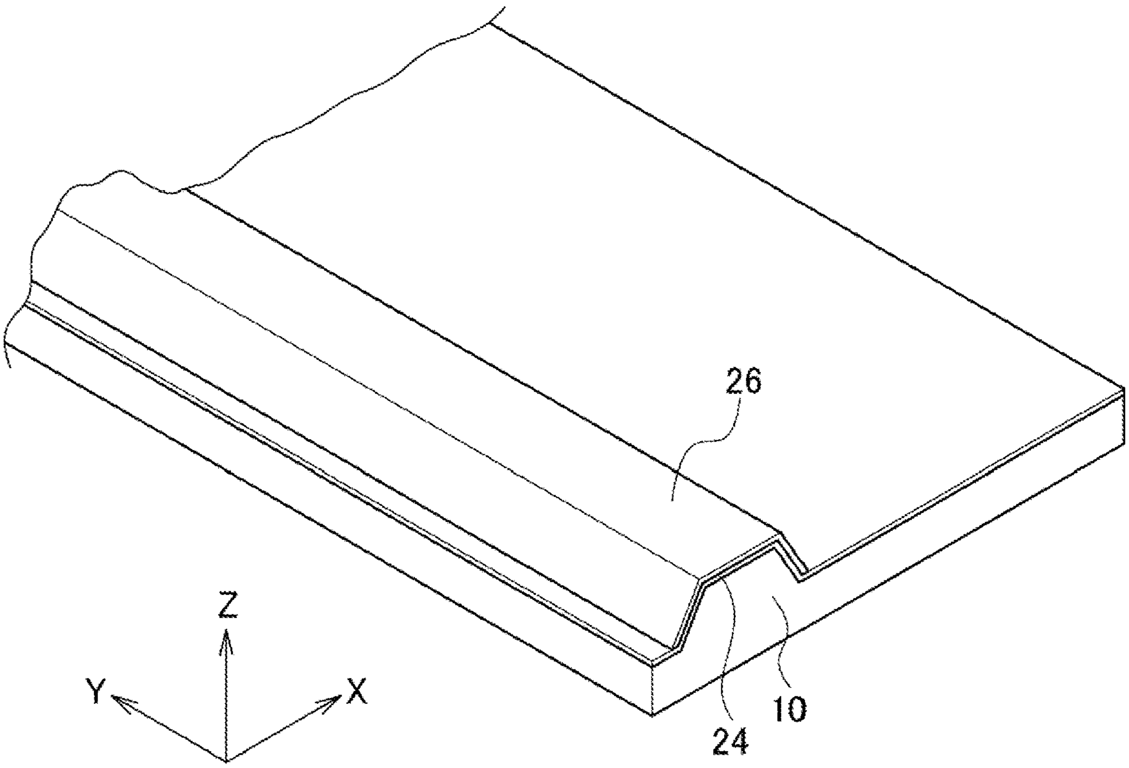
FIG. 27 is a perspective view for explaining a manufacturing method of another thermal print head according to a first embodiment (part 4).
Figure 28:
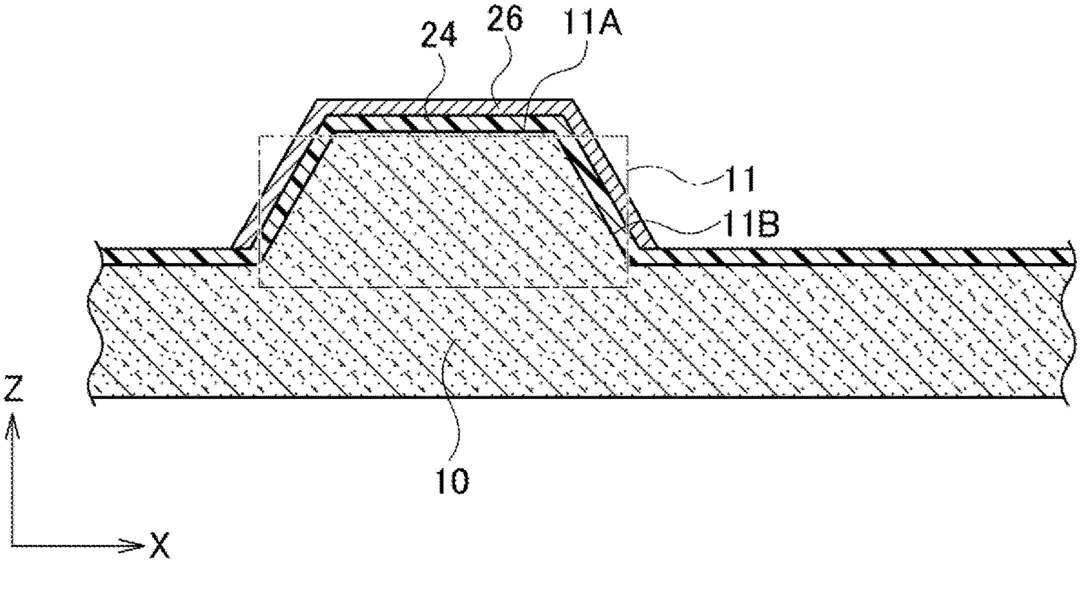
FIG. 28 is a cross-sectional view of FIG. 27.

Next, as shown in FIGS. 27 and 28, a part of the conductive film 26*a* is removed to form a wiring layer 26 that covers the top surface 11A and the side surfaces 11B of the convex part 11 of the substrate 10. Such removal can be performed by means of photolithography, for example.

The above described processes (the processes described with reference to FIGS. 11 to 20) can be used for subsequent processes for forming a heat storage layer, a resistor layer, a common electrode, an individual electrode, a protective film, and the like.

In a configuration in which the wiring layer 26 covers the upper surface and the side surfaces of the convex part 11 of the substrate 10, the wiring layer 26 and the first electrode 20*a* function as a common electrode. The first electrode 20*a* may contact the wiring layer 26 through an opening that is provided to pass through the insulating layer 14, the heat storage layer 16, and the resistor layer 18 as described above. In addition, an opening may be provided in a region of the resistor layer 18 which is in contact with the side surface of the convex part 11 of the substrate 10 and the first electrode 20*a* and the wiring layer 26 may be in contact through the opening.

According to the present embodiment, when viewed along the thickness direction Z, the wiring layer 12 (or the wiring layer 26), which is a part of the common electrode, is superimposed with the second electrode 20*b*, which is the individual electrode, and therefore high integration of the common electrode and the individual electrode becomes possible. This can reduce the electrode pitch and form a high-definition electrode pattern. Accordingly, high-definition printing can be performed on a printing medium while ensuring a good yield.

Second Embodiment

<Thermal Print Head>

The thermal print head according to the present embodiment will be described with reference to the drawings.

Figure 29:
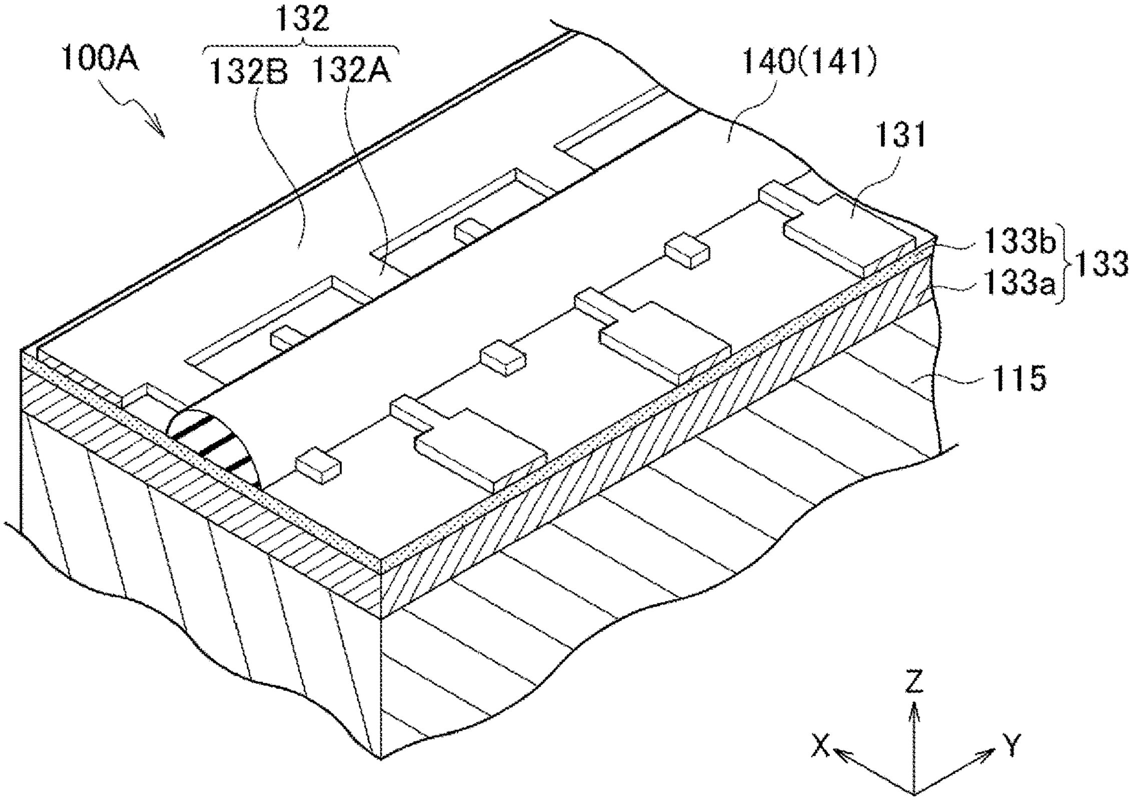
FIG. 29 is a partial perspective view for explaining a single substrate used in a thermal print head according to a second embodiment.
Figure 30:
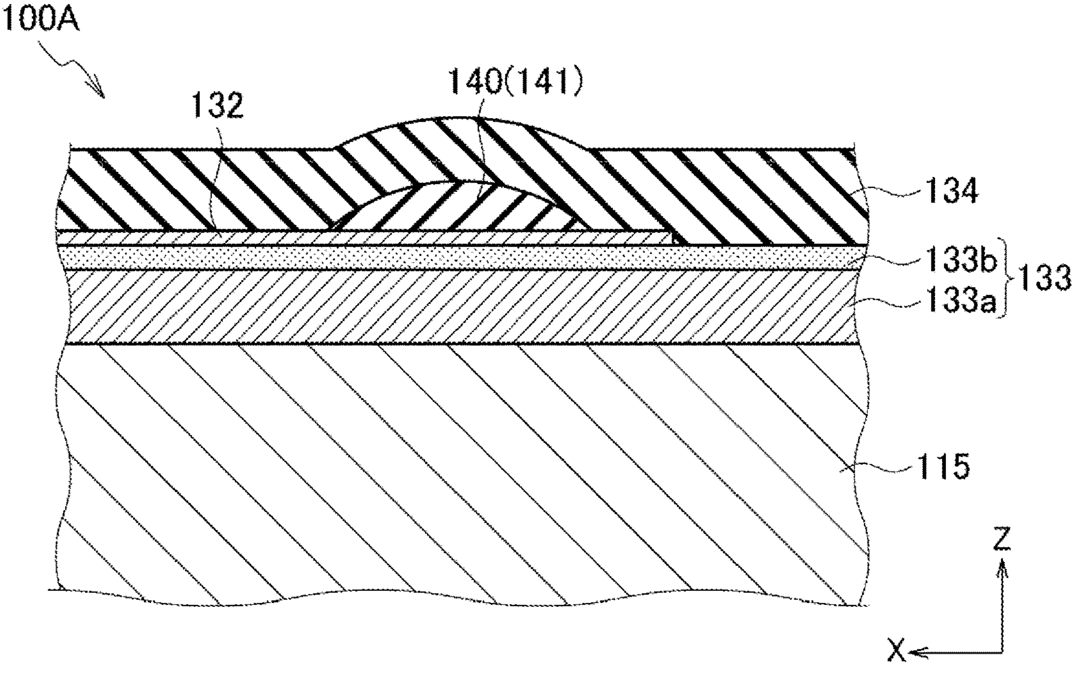
FIG. 30 is a partial cross-sectional view of FIG. 29.

FIGS. 29 and 30 show one substrate which is a part of a thermal print head. In the present embodiment, a substrate that has been cut from a semiconductor substrate and is included in the one thermal print head is referred to as a single substrate 100A. The single substrate 100A includes: a substrate 115; a heat storage layer 133 extending linearly on the substrate 115; an individual electrode 131 and a common electrode 132 on the heat storage layer 133; a heat generation resistor 140 on the individual electrode 131, the common electrode 132, and the heat storage layer 133; and a protective film 134 on the individual electrode 131, the common electrode 132, the heat storage layer 133, and the heat generation resistor 140. The heat storage layer 133 has a first layer 133*a* and a second layer 133*b* on the first layer 133*a*. The first layer 133*a* contains glass and the second layer 133*b* is a porous layer containing a different material from the first layer 133*a*. Further, the individual electrode 131 and the common electrode 132 are collectively referred to as wiring. The heat generation resistor 140 includes a plurality of heat generation resistors 141 that generate heat due to a current flowing through the wiring (the individual electrode 131 and common electrode 132). The plurality of heat generation resistors 141 are linearly arranged on the heat storage layer 133.

In the present embodiment, the direction in which the plurality of heat generation resistors 141 extend linearly is defined as the main scanning direction Y. The direction perpendicular to the main scanning direction Y and parallel to the upper surface of the substrate 115 is defined as the sub-scanning direction X. The direction corresponding to the thickness of the substrate 115 is defined as the thickness direction Z. In other words, the thickness direction Z is perpendicular to both the main scanning direction Y and the sub-scanning direction X.

The substrate 115 is made of ceramic or a single crystal semiconductor. An alumina substrate or the like can be used as the ceramic substrate, for example. As the single crystal semiconductor substrate, a silicon substrate or the like can be used, for example. From the viewpoint of heat dissipation, it is preferable to use an alumina substrate with relatively high thermal conductivity for the substrate 115.

A heat storage layer 133 (also referred to as a glaze layer) having a function of storing heat is laminated on a substrate 115 formed of an alumina substrate or the like. The heat storage layer 133 stores heat generated from a heating resistive part 141 which will be described later. The heat storage layer 133 can be formed by using an insulating material, and silicon oxide and silicon nitride, which are the main components of glass, can be used, for example. The dimension of the heat storage layer 133 in the thickness direction Z is not particularly limited, and is 30 to 80 μm, and preferably 40 to 60 μm, for example.

The heat storage layer 133 of the present embodiment has a first layer 133*a* and a second layer 133*b*. The first layer 133*a* is a non-porous layer containing glass. The dimension of the first layer 133*a* in the thickness direction Z is 20 to 60 μm, and preferably 30 to 50 μm from the viewpoint of pressure resistance.

The second layer 133*b* is a porous layer containing a different material from the first layer 133*a*. The second layer 133*b* may contain porous glass, which is a different glass material from the first layer 133*a*, for example. The porous glass may be Shirasu porous glass that is $CaO—Al_2O_3—B_2O_3—SiO_2$ glass. A large number of pores are formed in the surface of the second layer 133*b*. The solvent contained in the metal paste used to form the individual electrode 131 and the common electrode 132, which will be described later, permeates into the pores in the surface of the second layer 133*b*. This penetration makes it possible to suppress the spreading of the wiring pattern of the individual electrode 131 and the common electrode 132. The porosity of the second layer 133*b* is not particularly limited and may be adjusted appropriately according to the physical properties of the paste formed on the second layer 133*b*.

The dimension of the second layer 133*b* in the thickness direction Z is 10 to 30 μm, and preferably 10 to 20 μm.

The second layer 133*b* is a porous layer and has inferior pressure resistance compared to the first layer 133*a*. Therefore, by using the heat storage layer 133, which has a laminated structure of the first layer 133*a* and the second layer 133*b*, it becomes possible to form a high-definition wiring pattern by means of the action of the second layer 133*b* while ensuring pressure resistance by means of the action of the first layer 133*a*. By making the thickness of the second layer 133*b* smaller than that of the first layer 133*a* or by making the viscosity of the first layer 133*a* higher than that of the second layer 133*b*, a high-definition wiring pattern can be formed while ensuring pressure resistance.

Wiring (the individual electrode 131 and common electrode 132) formed of the metal paste is disposed on the heat storage layer 133. The common electrode 132 has a comb-tooth part 132A and a common part 132B. The individual electrode 131 has a wide part and a narrow part. The comb-tooth part 132A of the common electrode 132 may also have the wide part and the narrow part.

Wiring is obtained by applying the metal paste by means of a screen printing method or the like and forming a wiring pattern. The metal paste, which is the raw material of the wiring, is applied on the second layer 133*b*, which is a porous layer. Therefore, the solvent contained in the metal paste permeates into the pores of the second layer 133*b*. This penetration prevents the metal paste from wetting and spreading on the second layer 133*b*. Specifically, the actual wiring width can be 1.5 times or less of the designed wiring width. By adjusting the viscosity of the glass paste used as the material for the second layer 133*b*, the porosity of the second layer 133*b*, and the like to be appropriate values, the wiring width can be 1.2 times or less of the designed wiring width. When the ratio of the wiring width relative to the designed wiring width is close to one, a higher-definition wiring pattern can be formed. The wiring width of the wiring (the individual electrode 131 and common electrode 132 (the comb-tooth part 132A)) can be 20 μm or more and 50 μm or less, for example. The interval between adjacent wiring (the interval between the outer edges of the wide parts of adjacent wiring (the size of the gap)) can be 10 μm or more and 50 μm or less. The center-to-center spacing (the wiring pitch) of adjacent wiring can be more than 40 μm and 70 μm or less.

As the metal paste, a paste containing metal particles such as copper, silver, palladium, iridium, platinum, and gold can be used, for example. It is preferable to use copper, silver, platinum, and gold from the viewpoint of metal properties and ionization tendencies. It is more preferable to use copper and silver from the viewpoint of metal properties, ionization tendencies, and cost reduction. The solvent contained in the metal paste has the function of dispersing the metal particles uniformly, for example. An example of the solvent is a mixture of one or more kinds of an ester solvent, a ketone solvent, a glycol ether solvent, an aliphatic solvent, an alicyclic solvent, an aromatic solvent, an alcohol solvent, water, and the like, but the solvent is not limited thereto.

Examples of the ester solvent include ethyl acetate, isopropyl acetate, n-butyl acetate, isobutyl acetate, amyl acetate, ethyl lactate, dimethyl carbonate, and the like. Examples of the ketone solvent include acetone, methyl ethyl ketone, methyl isobutyl ketone benzene, diisobutyl ketone, diacetone alcohol, isophorone, cyclohexanone, and the like. Examples of the glycol ether solvent include acetate esters of monoethers such as ethylene glycol monoethyl ether, ethylene glycol monoisopropyl ether, and ethylene glycol monobutyl ether; and acetate esters of monoethers such as diethylene glycol dimethyl ether, diethylene glycol diethyl ether, diethylene glycol monoethyl ether, diethylene glycol monobutyl ether, propylene glycol monomethyl ether, propylene glycol monoethyl ether, and the like.

Examples of the aliphatic solvent include n-heptane, n-hexane, cyclohexane, methylcyclohexane, ethylcyclohexane, and the like. Examples of the alicyclic solvent include methylcyclohexane, ethylcyclohexane, cyclohexane, and the like. Examples of the aromatic solvent include toluene, xylene, tetralin, and the like. Examples of the alcohol solvent (excluding the glycol ether solvent described above) include ethanol, propanol, butanol, and the like.

The metal paste can contain dispersants, surface treatment agents, anti-friction enhancers, infrared absorbers, ultraviolet absorbers, aromatic agents, antioxidants, organic pigments, inorganic pigments, defoamers, silane coupling agents, titanate-based coupling agents, plasticizers, flame retardants, moisturizers, ion scavengers, and the like when necessary.

The individual electrodes 131 have a strip shape that substantially extends in the sub-scanning direction X, and are not conductive with one another. Therefore, different potentials can be individually given to the individual electrodes 131 when a printer into which the thermal print head is incorporated is used. An individual pad part is formed at the end of each individual electrode 131.

The common electrode 132 is a site that is electrically opposite in polarity to the plurality of individual electrodes 131 when a printer into which the thermal print head is incorporated is used. The common electrode 132 has a plurality of comb-tooth parts 132A and a common part 132B that connects the plurality of comb-tooth parts 132A in common. The common part is formed in the main scanning direction Y along the upper edge of the substrate 115. Each comb-tooth part has a strip shape that is divided from the common part and extends in the sub-scanning direction X. The tip of each comb-tooth part enters between the tips of two adjacent individual electrodes 131 and faces the two individual electrodes 131 at a predetermined interval along the main scanning direction Y.

The tip of each comb-tooth part may face the tip of each individual electrode 131 at a predetermined interval along the sub-scanning direction X. In this case, it is preferable that the heating resistive part 141 is formed only in the region where the tip of each comb-tooth part and the tip of each individual electrode 131 face each other. In other words, in the main scanning direction Y, it is preferable that the heating resistive part 141 is not disposed in a region other than the region where the tip of each comb-tooth part and the tip of each individual electrode 131 face each other.

A part of the heating resistive part 141 to which the current from the wiring (the individual electrode 131 and common electrode 132) flows generates heat. Specifically, the heating resistive part 141 to which a print signal transmitted from an external device such as a drive IC is input is individually energized according to the print signal and then the heating resistive part 141 is made to selectively generate heat. Due to the generation of heat in this way, printing dots are formed. The heating resistive part 141 is formed by using a material having a higher resistivity than the material forming the wiring, for example, and tantalum nitride or silicon oxide containing tantalum can be used. Ruthenium oxide may be used as a material of the heating resistive part 141. In the present embodiment, the dimension of the heating resistive part 141 in the thickness direction Z is about 0.05 to 0.2 μm, for example.

The wiring, the heating resistive part 141, and the like are covered with a protective film 134 to protect the wiring and the heating resistive part 141 from wear, corrosion, oxidation, and the like. The protective film 134 can be formed by using an insulating material, for example, and silicon nitride, silicon oxide, and the like can be used. The dimension of the protective film 134 in the thickness direction Z is about 3 to 8 μm, for example.

Here, the manufacturing method of the single substrate 100A of the present embodiment will be described.

Figure 31:
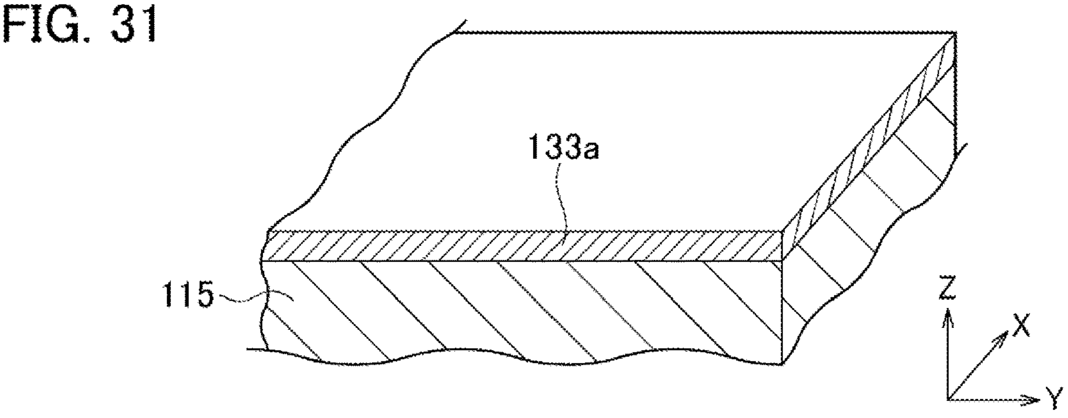
FIG. 31 is a partial perspective view for explaining a manufacturing method of a thermal print head according to a second embodiment (part 1).
Figure 32:
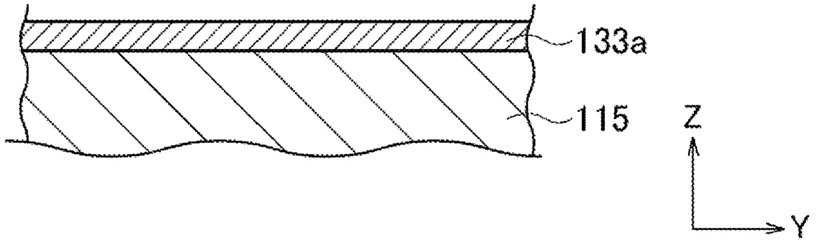
FIG. 32 is a partial cross-sectional view of FIG. 31.

As shown in FIGS. 31 and 32, first, a substrate 115 is prepared. Then, a first glass paste (corresponding to the first layer 133*a* before firing) is applied on the substrate 115 by means of screen printing or the like. Then, the applied first glass paste is dried. Thereafter, the first layer 133*a*, which becomes a part of the heat storage layer 133, can be formed on the substrate 115 by performing a firing treatment which will be described later. The viscosity of the first layer 133*a* before firing is 50 cP or more and 200 cP or less.

Figure 33:
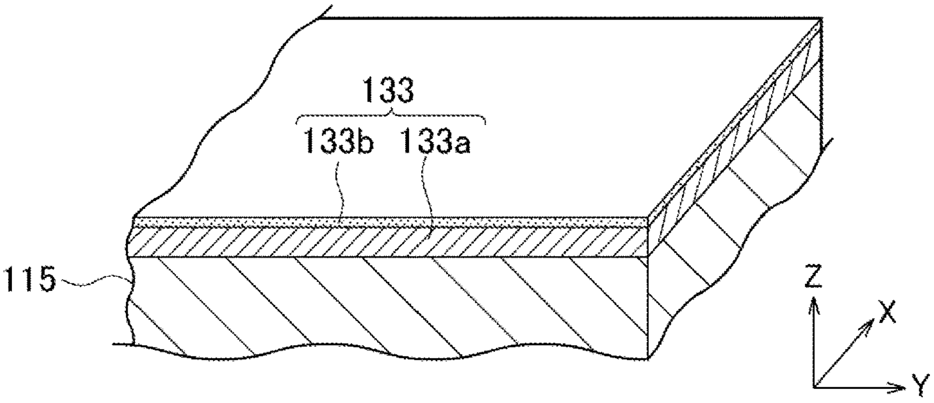
FIG. 33 is a partial perspective view for explaining a manufacturing method of a thermal print head according to a second embodiment (part 2).
Figure 34:
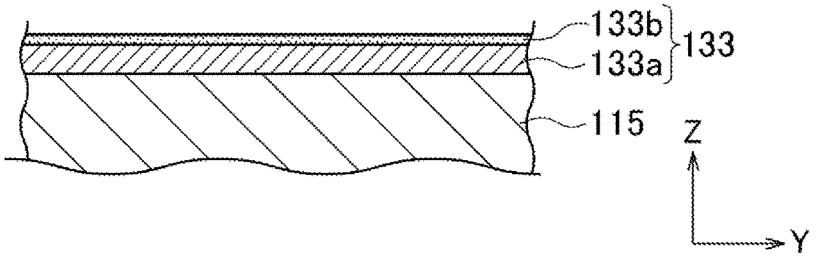
FIG. 34 is a partial cross-sectional view of FIG. 33.

Next, as shown in FIGS. 33 and 34, a second glass paste (corresponding to the second layer 133*b* before firing) is applied on the dried first glass paste by means of screen printing or the like, and the applied paste-like porous material is dried. Then, the dried first and second glass pastes are subjected to a firing treatment and a heat treatment and the heat storage layer 133 having the first layer 133*a* and the second layer 133*b* is formed on the substrate 115. In the present embodiment, by the second glass paste being subjected to the firing treatment and the heat treatment, porous glass is formed from the separated glass. Communication holes of the porous glass contain air. The porous glass is an air-containing material. The firing treatment is performed at 1250° C. for 4.5 hours, for example. The viscosity of the second layer 133*b* before firing is 50 cP or more and 200 cP or less.

Figure 35:
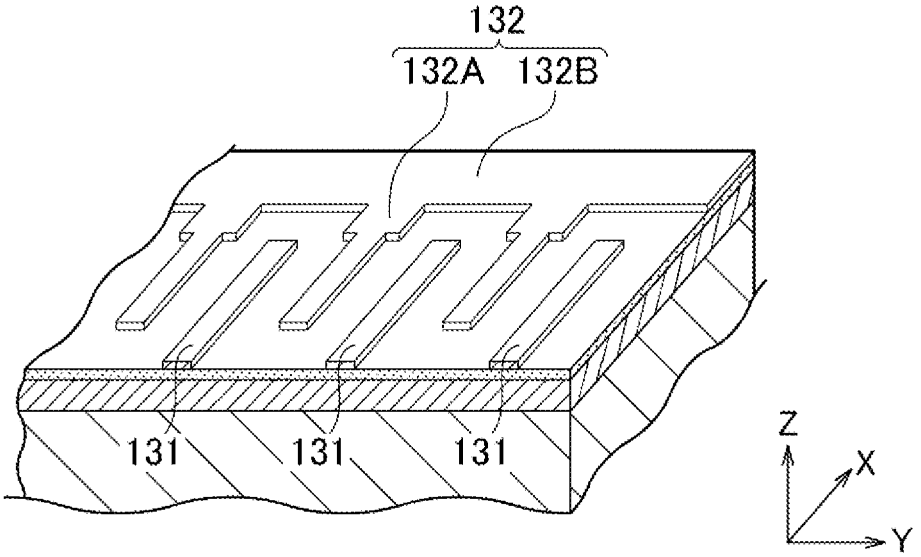
FIG. 35 is a partial perspective view for explaining a manufacturing method of a thermal print head according to a second embodiment (part 3).
Figure 36:
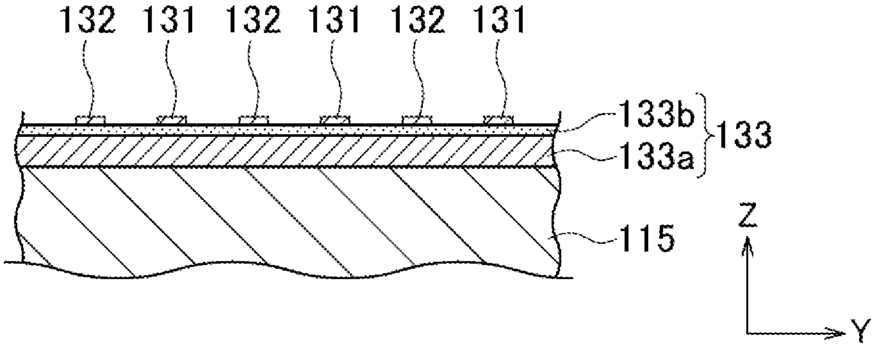
FIG. 36 is a partial cross-sectional view of FIG. 35.

Next, the individual electrodes 131 and the common electrodes 132 are formed on the heat storage layer 133 as shown in FIGS. 35 and 36. Each common electrode 132 has a comb-tooth part 132A and a common part 132B. The individual electrodes 131 and the common electrodes 132 can be obtained by applying the metal paste described above by means of screen printing or the like and forming a wiring pattern. The heat storage layer 133 of the present embodiment has the second layer 133*b*, which is a porous layer. Therefore, the solvent contained in the metal paste permeates into the pores of the second layer 133*b*. Due to this penetration, the metal paste can be prevented from wetting and spreading on the second layer 133*b*. Accordingly, the wiring patterns of the individual electrodes 131 and the common electrodes 132 can be formed directly on the heat storage layer 133 without performing the process of forming the wiring pattern by means of photolithography or the like. This can simplify the process of forming the wiring patterns of the individual electrodes 131 and the common electrodes 132, and further form a higher definition wiring pattern.

Figure 37:
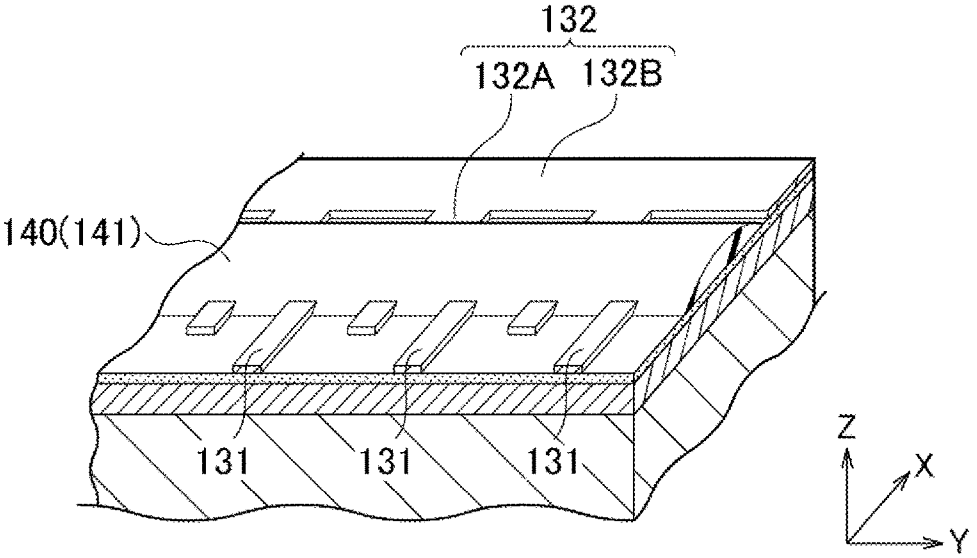
FIG. 37 is a partial perspective view for explaining a manufacturing method of a thermal print head according to a second embodiment (part 4).
Figure 38:
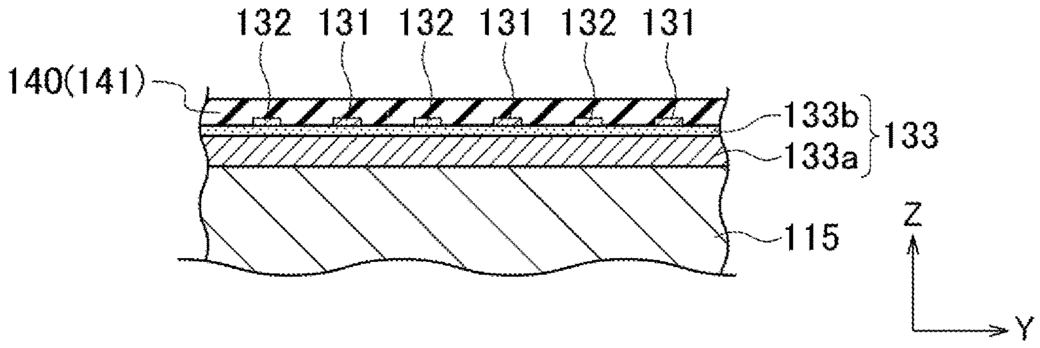
FIG. 38 is a partial cross-sectional view of FIG. 37.

Next, as shown in FIGS. 37 and 38, a heat generation resistor 140 (a heating resistive part 141) is formed by means of a thick film forming technique. The heat generation resistor 140 (the heating resistive part 141) is formed by means of screen printing or firing a resistor paste supplied from a dispenser. The resistor paste contains ruthenium oxide, for example.

Further, as shown in FIG. 30, a protective film 134 is formed by means of a thin film forming technique. The protective film 134 can be formed by using silicon nitride using CVD or the like, for example. The protective film 134 may be formed by means of a thick film forming technique. In this case, the protective film 134 made of glass is formed by firing a screen-printed glass paste.

The thermal print head of the present embodiment can be manufactured by performing the above processes.

According to the present embodiment, by having the second layer 133*b*, which is a porous layer, a high-definition wiring pattern can be obtained. Further, by having the heat storage layer 133 in which the first layer 133*a* and the second layer 133*b* are laminated, it becomes possible to ensure the pressure resistance of the heat storage layer 133 in addition to obtaining the high-definition wiring pattern.

<Thermal Printer>

The thermal print head 200 will be described with reference to FIG. 39. A description will be given assuming that the thermal print head 200 has the single substrate 100 described in the first embodiment. The thermal print head 200 includes the substrate 10 (FIG. 39 does not show the wiring layer 12, the heat storage layer 16, and the like on the substrate 10), the connection substrate 5, and the heat dissipation member 8. The substrate 10 and the connection substrate 5 are mounted on the heat dissipation member 8 so as to be adjacent to each other in the sub-scanning direction X. On the substrate 10, the plurality of heating resistive parts 18*a* are arranged in the main scanning direction Y. The heating resistive parts 18*a* are driven to generate heat selectively by means of the drive IC 7 mounted on the connection substrate 5. The heating resistive parts 18*a* perform printing on a printing medium 92 such as thermal paper pressed against the heating resistive parts 18*a* by means of a platen roller 91, according to a print signal transmitted from the outside via the connector 59.

As the connection substrate 5, a printed wiring board can be used, for example. The connection substrate 5 has a structure in which a base material layer and a wiring layer (not shown) are laminated. A glass epoxy resin or the like can be used for the base material layer, for example. As the material of the wiring layer, metals such as copper, silver, palladium, iridium, platinum, and gold can be used, for example.

The heat dissipation member 8 has a function of dissipating heat from the substrate 10. The substrate 10 and the connection substrate 5 are attached on the heat dissipation member 8. Metal such as aluminum can be used for the heat dissipation member 8, for example.

A thermal printer of the present embodiment can have the single substrate described above. The thermal printer performs printing on a printing medium. Examples of the printing medium include thermal paper for creating barcode sheets and receipts.

The thermal printer includes the thermal print head 200, the platen roller 91, a main power supply circuit, a measurement circuit, and a control part, for example. The platen roller 91 faces the thermal print head 200.

The main power supply circuit supplies power to the plurality of heating resistive parts 18*a* of the thermal print head 200. The measurement circuit measures a resistance value of each of the plurality of heating resistive parts 18*a*. The measurement circuit measures the resistance value of each of the plurality of heating resistive parts 18*a* when printing is not performed on a printing medium, for example. This can confirm the life of the heating resistive parts 18*a* and whether there are failed heating resistive parts 18*a*. The control part controls the driving states of the main power supply circuit and the measurement circuit. The control part controls the energization state of each of the plurality of heating resistive parts 18*a*. There are cases where the measurement circuit is omitted.

The connector 59 is used for communication with devices outside the thermal print head 200. The thermal print head 200 is electrically connected to the main power supply circuit and the measurement circuit via the connector 59. The thermal print head 200 is electrically connected to the control part via the connector 59.

The drive IC 7 receives a signal from the control part via the connector 59. Based on the signal received from the control part, the drive IC 7 controls the energization state of each of the plurality of heating resistive parts 18*a*. Specifically, the drive IC 7 causes a plurality of individual electrodes (the second electrode 20*b*) to be selectively energized so that any one of the plurality of heating resistive parts 18*a* is caused to generate heat as desired.

Next, how to use the thermal printer will be described.

When printing is performed on a printing medium, a potential V11 is given to the connector 59 from the main power supply circuit as a potential V1. In this case, the plurality of heating resistive parts 18*a* are energized selectively and generate heat. By transferring the heat to the printing medium, printing is performed on the printing medium. As described above, when the potential V11 is given to the connector 59 from the main power supply circuit as the potential V1, a conduction path to each of the plurality of heating resistive parts 18*a* is ensured.

When printing is not performed on the printing medium, the resistance value of each heating resistive part 18*a* is measured. During the measurement, no potential is given to the connector 59 from the main power supply circuit. When the resistance value of each heating resistive part 18*a* is measured, a potential v12 is given to the connector 59 from the measurement circuit as the potential V1. In this case, the plurality of heating resistive parts 18*a* are energized sequentially (for example, in the order from a heating resistive part 18*a* located at an end in the main scanning direction Y). The measurement circuit measures the resistance value of each heating resistive part 18*a* based on the value of the current flowing through the heating resistive parts 18*a* and the potential v12. As described above, when the potential v11 is given to the connector 59 from the main power supply circuit as the potential V1, the conduction path to each of the plurality of heating resistive parts 18*a* is substantially interrupted. This makes it possible to measure the resistance value of each heating resistive part 18*a* more accurately by means of the measurement circuit. Accordingly, it is possible to confirm the life of the heating resistive parts 18*a* and whether there are failed heating resistive parts 18*a*.

According to the present embodiment, a high-definition electrode pattern can be formed by reducing the electrode pitch, and it is possible to obtain a thermal printer that can perform high-definition printing on a printing medium while ensuring a good yield.

Other Embodiments

As mentioned above, some of the embodiments have been described, but the statements and drawings that form part of the disclosure are illustrative and should not be understood as limiting. Various alternative embodiments, examples, and operating techniques will be apparent to those skilled in the art from this disclosure. In this way, the present embodiment includes various embodiments and the like that are not described herein.

The single substrate 100 of the first embodiment may be configured to include the heat storage layer having the two types of layers described in the second embodiment, for example.

EXAMPLES OF EMBODIMENTS

Examples of embodiments of the present invention will be described below. The embodiments of the present invention are not limited to the following examples.

Appendix 1

A thermal print head including: a heat storage layer having a first layer and a second layer formed over the first layer; wiring formed over the heat storage layer; a heat generation resistor formed over the wiring; and a protective film that covers the heat storage layer, the wiring, and the heat generation resistor, in which the first layer contains glass and the second layer is a porous layer.

Appendix 2

The thermal print head according to [Appendix 1], in which the thickness of the second layer is smaller than the thickness of the first layer.

Appendix 3

The thermal print head according to [Appendix 1] or [Appendix 2], in which the second layer contains porous glass.

Appendix 4

The thermal print head according to any one of [Appendix 1] to [Appendix 3], in which the interval between the adjacent wiring is 10 μm or more and 50 μm or less.

Appendix 5

The thermal print head according to any one of [Appendix 1] to [Appendix 3], in which the center-to-center spacing of the adjacent wiring is more than 40 μm and 70 μm or less.

Appendix 6

A thermal printer including the thermal print head according to any one of [Appendix 1] to [Appendix 5].

Appendix 7

A manufacturing method of a thermal print head including: forming a heat storage layer including a first layer containing glass and a second layer that is a porous layer, the first layer being formed over a substrate and the second layer being formed over the first layer; forming wiring over the heat storage layer; forming a heat generation resistor over the wiring; and forming a protective film that covers the heat storage layer, the wiring, and the heat generation resistor.

Appendix 8

The manufacturing method of a thermal print head according to [Appendix 7], in which the heat storage layer is formed by forming the first layer containing the glass and the second layer that is the porous layer, the first layer and the second layer being formed by applying a first glass paste, drying the applied first glass paste, applying a second glass paste over the dried first glass paste, drying the applied second glass paste, and firing the dried first glass paste and the dried second glass paste.

Appendix 9

The manufacturing method of a thermal print head according to [Appendix 7] or [Appendix 8], in which the thickness of the second layer is smaller than the thickness of the first layer.

Appendix 10

The manufacturing method of a thermal print head according to any one of [Appendix 7] to [Appendix 9], in which the second layer contains porous glass.

Appendix 11

The manufacturing method of a thermal print head according to any one of [Appendix 7] to [Appendix 10], in which an interval between the adjacent wiring is 10 μm or more and 50 μm or less.

Appendix 12

The manufacturing method of a thermal print head according to any one of [Appendix 7] to [Appendix 10], in which the center-to-center spacing of the adjacent wiring is more than 40 μm and 70 μm or less.

The invention claimed is:

1. A thermal print head comprising:

a substrate having a convex part thereon;

a wiring layer over the convex part;

a heat storage layer over the wiring layer;

a heating resistive part that is formed over the heat storage layer and is arranged along a main scanning direction;

a plurality of first electrodes in contact with the heating resistive part on one side in a sub-scanning direction;

a plurality of second electrodes in contact with the heating resistive part on another side in the sub-scanning direction;

a plurality of openings, wherein each of the openings corresponds to a respective one of the first electrodes and to a respective one or more of the plurality of second electrodes and passes through the heating resistive part and the heat storage layer and reaches the wiring layer, and a plurality of connection wirings, wherein each of the connection wirings is present in a respective one of the openings, wherein the first electrodes are electrically connected to the wiring layer via the connection wirings.

2. The thermal print head according to claim 1, wherein the wiring layer contains silicide.

3. The thermal print head according to claim 1, wherein the wiring layer covers an upper surface and a side surface of the convex part.

4. The thermal print head according to claim 1, wherein the wiring layer contains metal.

5. The thermal print head according to claim 1, wherein the substrate and the convex part are integrally formed by using a single crystal semiconductor.

6. The thermal print head according to claim 5, wherein the single crystal semiconductor is made of silicon.

7. The thermal print head according to claim 1, wherein each of the first electrodes is a part of a common electrode and each of the second electrodes is an individual electrode.

8. A thermal printer including the thermal print head according to claim 1.

9. The thermal print head according to claim 1, wherein a pad is present next to an end of the second electrodes, the openings passing through the heating resistive part are made on a side of the first electrodes of a line in which heating resistive parts are arranged along the main scanning direction, and an opening at the pad is made on a side of the second electrodes of the line.

10. The thermal print head according to claim 9, wherein a power source is configured to be applied to the wiring layer by at least one first electrode of the first electrodes and the pad.

11. The thermal print head according to claim 1, wherein the openings and the wiring layer are formed within a range of a width of the convex part in the sub-scanning direction.

* * * * *